(12) United States Patent
Luo et al.

(10) Patent No.: US 11,510,059 B2
(45) Date of Patent: Nov. 22, 2022

(54) DATA SECURITY PROCESSING METHOD AND APPARATUS

(71) Applicant: HUAWEI TECHNOLOGIES CO., LTD., Guangdong (CN)

(72) Inventors: Haiyan Luo, Shanghai (CN); Mingzeng Dai, Shanghai (CN); Yi Guo, Shenzhen (CN); Xudong Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 541 days.

(21) Appl. No.: 16/576,121

(22) Filed: Sep. 19, 2019

(65) Prior Publication Data

US 2020/0015088 A1 Jan. 9, 2020

Related U.S. Application Data

(63) Continuation of application No. PCT/CN2018/108657, filed on Sep. 29, 2018.

(30) Foreign Application Priority Data

Sep. 29, 2017 (CN) .......................... 201710910826.5

(51) Int. Cl.
*H04W 36/00* (2009.01)
*H04W 12/106* (2021.01)
*H04W 76/19* (2018.01)
*H04W 76/27* (2018.01)
(Continued)

(52) U.S. Cl.
CPC ....... *H04W 12/106* (2021.01); *H04W 12/033* (2021.01); *H04W 12/041* (2021.01);
(Continued)

(58) Field of Classification Search
CPC . H04W 12/06; H04W 36/0038; H04W 76/19; H04W 76/27
See application file for complete search history.

(56) References Cited

U.S. PATENT DOCUMENTS

2011/0305339 A1  12/2011  Norrman et al.
2017/0013454 A1  1/2017  Lee et al.
(Continued)

FOREIGN PATENT DOCUMENTS

CN  102612029 A  7/2012
CN  103929740 A  7/2014
(Continued)

OTHER PUBLICATIONS

3GPP TS 38.300 V1.0.0 (Sep. 2017), :3rd Generation Partnership Project; Technical Specification Group Radio Access Network; NR; NR and NG-RAN Overall Description; Stage 2 (Release 15), Sep. 2017, 59 pages.
(Continued)

*Primary Examiner* — Matthew T Henning
(74) *Attorney, Agent, or Firm* — Fish & Richardson P.C.

(57) ABSTRACT

Example data security processing methods and apparatus are described. One example method includes setting up a first PDU session. A first base station derives a first user plane key based on a received base key and performs security processing on user plane data in the first PDU session by using the first user plane key and a security algorithm. A second PDU session is set up. The first base station derives a second user plane key based on the base key and performs security processing on user plane data in the second PDU session by using the second user plane key and the security algorithm. The user plane key includes a user plane encryption key and/or a user plane integrity protection key.

13 Claims, 22 Drawing Sheets

(51) Int. Cl.
  *H04W 12/06* (2021.01)
  *H04W 12/033* (2021.01)
  *H04W 12/041* (2021.01)

(52) U.S. Cl.
  CPC ....... *H04W 12/06* (2013.01); *H04W 36/0038* (2013.01); *H04W 76/19* (2018.02); *H04W 76/27* (2018.02)

(56) References Cited

U.S. PATENT DOCUMENTS

| | | | |
|---|---|---|---|
| 2017/0208516 A1 | 7/2017 | Kubota et al. | |
| 2019/0068625 A1* | 2/2019 | Alfano | H04L 63/1408 |
| 2019/0174367 A1 | 6/2019 | Sharma | |
| 2019/0182737 A1* | 6/2019 | Futaki | H04W 24/10 |

FOREIGN PATENT DOCUMENTS

| | | |
|---|---|---|
| CN | 104185177 A | 12/2014 |
| CN | 104937964 A | 9/2015 |
| CN | 106998537 A | 8/2017 |
| WO | 2015037926 A1 | 3/2015 |
| WO | WO-2018174887 A1 * | 9/2018 |

OTHER PUBLICATIONS

EPO Communication pursuant to Article 94(3) EPC issued in European Application No. 18862074.4 dated Sep. 23, 2020, 7 pages.
Office Action issued in Chinese Application No. 201710910826.5 dated May 8, 2020, 6 pages (with English translation).
Office Action issued in Indian Application No. 201937031404 dated Jan. 11, 2021, 5 pages.
3GPP TR 33.899 V0.4.0 (Aug. 2016), "3rd Generation Partnership Project; Technical Specification Group Services and System Aspects; Study on the security aspects of the next generation system (Release 14)," XP051172387, Aug. 2016, 156 pages.
3GPP TR 33.899 V1.3.0 (Aug. 2017), "3rd Generation Partnership Project; Technical Specification Group Services and System Aspects; Study on the security aspects of the next generation system (Release 14)," XP051450230, Aug. 2017, 605 pages.
EPO Partial Supplementary European Search Report issued in European Application No. 18862074.4 dated Oct. 9, 2019, 15 pages.
PCT International Search Report and Written Opinion issued in International Application No. PCT/CN2018/108657 dated Dec. 5, 2018, 17 pages (with English translation).
Office Action issued in Chinese Application No. 201710910826.5 dated Dec. 18, 2019, 19 pages (with English translation).

* cited by examiner

DATA SECURITY PROCESSING METHOD AND APPARATUS

CROSS-REFERENCE TO RELATED APPLICATIONS

This application is a continuation of International Application No. PCT/CN2018/108657, filed on Sep. 29, 2018, which claims priority to Chinese Patent Application No. 201710910826.5, filed on Sep. 29, 2017. The disclosures of the aforementioned applications are hereby incorporated by reference in their entireties.

TECHNICAL FIELD

This application relates to the field of communications technologies, and in particular, to a data security processing method and an apparatus.

BACKGROUND

In a communications system, data security is implemented based on a security algorithm, and various security algorithms may provide confidentiality and integrity protection for data. In a long term evolution (LTE) system, security authentication needs to be performed on communication between a base station and user equipment (UE) by using a security algorithm. A security authentication process is as follows: A mobility management entity (MME) generates a network-side air interface protection key (KeNB), and then sends the KeNB and UE security capability information to the base station. The base station selects a proper security algorithm (encryption algorithm and integrity protection algorithm) based on the UE security capability information and a security capability of the base station, and then sends the proper security algorithm to the UE. In addition, the base station derives a user plane key and a control plane key at an access stratum based on the KeNB by using a key derivation algorithm. The user plane key includes a user plane encryption key (Key User Plane encryption, KUPenc) and a user plane integrity protection key (Key User Plane integrity, KUPint). The control plane key includes a radio resource control (RRC) signaling protection key (RRC encryption key (Key RRC encryption, KRRCenc) and an RRC integrity protection key (Key RRC integrity, KRRCint). The UE side may derive all non-access stratum keys and access stratum keys. A process in which the UE side derives the user plane key and the control plane key at the access stratum based on the KeNB by using the key derivation algorithm is the same as that on the base station side, and a same key derivation algorithm specified in a protocol is used. Finally, the UE encrypts and/or performs integrity protection on user plane data and an RRC message based on the encryption algorithm and the integrity protection algorithm selected by the base station and the user plane key and the control plane key. This is also the case when the base station side sends data.

In the prior art, when a protocol data unit (PDU) session is set up between the UE and the base station for the first time, both the UE side and the base station side use a key derivation algorithm to derive a user plane key and a control plane key at an access stratum based on KeNB, and then encryption and integrity protection for all services of the UE use a key that is the same as a key (including a user plane key and a control plane key) generated when the PDU session is set up for the first time.

However, if the key generated when the PDU session is set up for the first time is cracked, the key cannot be used in a subsequent service of the UE, and data transmission security is not high.

SUMMARY

This application provides a data security processing method and an apparatus, so as to improve data transmission security.

According to a first aspect, this application provides a data security processing method, including: setting up a first protocol data unit (PDU) session; deriving, by a first base station, a first user plane key based on a received base key; performing, by the first base station, security processing on user plane data in the first PDU session by using the first user plane key and a security algorithm; setting up a second PDU session; deriving, by the first base station, a second user plane key based on the base key; and performing, by the first base station, security processing on user plane data in the second PDU session by using the second user plane key and the security algorithm, where the user plane key includes a user plane encryption key and/or a user plane integrity protection key.

According to the data security processing method provided in the first aspect, each time a PDU session is set up, the first base station derives a user plane key based on the base key and a PDU session identifier of the PDU session, and performs security processing on user plane data in the PDU session by using the derived user plane key and the security algorithm. Different PDU sessions use different user plane keys, thereby improving data transmission security.

In a possible design, the deriving, by a first base station, a first user plane key based on a received base key includes: deriving, by the first base station, the first user plane key based on the base key and a first parameter, where the first parameter is a first PDU session identifier; and the deriving, by the first base station, a second user plane key based on the base key includes: deriving, by the first base station, the second user plane key based on the base key and a second parameter, where the second parameter is a second PDU session identifier.

In a possible design, the method further includes: sending, by the first base station, a target base key and at least one PDU session identifier to a second base station, so that the second base station derives, based on the target base key and the at least one PDU session identifier, a user plane key corresponding to the PDU session identifier, where the target base key is derived by the first base station based on the base key and a third parameter.

In a possible design, after the sending, by the first base station, a target base key and at least one PDU session identifier to a second base station, the method further includes:

sending, by the first base station, a target security algorithm to user equipment (UE), where the target security algorithm is selected by the second base station for the UE based on UE security capability information sent by the first base station, and sent by the second base station to the first base station; and sending, by the first base station, the third parameter and the at least one PDU session identifier to the UE, so that the UE derives the target base key based on a base key of the UE and the third parameter, derives, based on the target base key and the at least one PDU session identifier, the user plane key corresponding to the PDU session identifier, and then performs security processing on user plane data in the PDU session by using the user plane key corresponding to the PDU session identifier and the target security algorithm.

In a possible design, the first base station is a source base station, the second base station is a target handover base station, and the third parameter includes at least one of a next-hop chain counter (NCC), a target cell identifier, and frequency information.

According to the data security processing method provided in this implementation, the first base station derives the target base key based on the base key and the third parameter, and sends the derived target base key and the at least one PDU session identifier to the second base station. The second base station derives, based on the target base key and the at least one PDU session identifier, the user plane key corresponding to the PDU session identifier. The second base station selects the target security algorithm for the UE based on the UE security capability information sent by the first base station. Therefore, the second base station performs security processing on the user plane data in the PDU session by using the user plane key corresponding to the PDU session identifier and the target security algorithm. The first base station further sends the third parameter and the at least one PDU session identifier to the UE. The UE derives the target base key based on the base key of the UE and the third parameter, derives, based on the target base key and the at least one PDU session identifier, the user plane key corresponding to the PDU session identifier, and performs security processing on the user plane data in the PDU session by using the user plane key corresponding to the PDU session identifier and the target security algorithm. When the third parameter includes at least one of the NCC, the target cell identifier, and the frequency information, key derivation and exchange in a process in which the source base station is handed over to the target handover base station are implemented.

In a possible design, the first base station is a master base station, the second base station is a secondary base station, and the third parameter includes a secondary cell group (SCG) counter.

According to the data security processing method provided in this implementation, key derivation and exchange in a DC scenario are implemented.

In a possible design, the method further includes: sending, by the first base station to the second base station, an indication indicating whether user plane integrity protection corresponding to the PDU session identifier is enabled, so that the second base station determines, according to the indication, whether to derive a user plane integrity protection key corresponding to the PDU session identifier.

In a possible design, the first base station includes a centralized unit (CU) and a distributed unit (DU), the CU includes a control plane CU and a user plane CU, the control plane CU is connected to the user plane CU through a communications interface, and the deriving, by the first base station, the first user plane key based on the base key and a first parameter includes: deriving, by the control plane CU, the first user plane key based on the base key and the first parameter, and sending the first parameter and the first user plane key corresponding to the first parameter to the user plane CU; and the deriving, by the first base station, the second user plane key based on the base key and a second parameter includes: deriving, by the control plane CU, the second user plane key based on the base key and the second parameter, and sending the second parameter and the second user plane key corresponding to the second parameter to the user plane CU.

According to the data security processing method provided in this implementation, the control plane CU receives the base key sent by the core network, derives a user plane key based on the base key and a PDU session identifier of each PDU session, and sends the PDU session identifier and the user plane key corresponding to the PDU session identifier to the user plane CU. The user plane CU performs security processing on the user plane data in the PDU session by using the user plane key corresponding to the PDU session identifier and the security algorithm, thereby improving data transmission security in a CP-UP separation scenario.

In a possible design, the first base station includes a centralized unit CU and a distributed unit DU, the CU includes a control plane CU and a user plane CU, the control plane CU is connected to the user plane CU through a communications interface, and the deriving, by the first base station, the first user plane key based on the base key and a first parameter includes: sending, by the control plane CU, the base key and the first parameter to the user plane CU, and deriving, by the user plane CU, the first user plane key based on the base key and the first parameter; and the deriving, by the first base station, the second user plane key based on the base key and a second parameter includes: sending, by the control plane CU, the base key and the second parameter to the user plane CU, and deriving, by the user plane CU, the second user plane key based on the base key and the second parameter.

According to the data security processing method provided in this implementation, the control plane CU receives the base key sent by the core network, and sends the base key and a PDU session identifier of each PDU session to the user plane CU. The user plane CU derives a user plane key based on the base key and the PDU session identifier of each PDU session, and performs security processing on the user plane data in the PDU session by using the user plane key corresponding to the PDU session identifier and the security algorithm, thereby improving data transmission security in a CP-UP separation scenario.

In a possible design, the method further includes: sending, by the control plane CU to the user plane CU, an indication indicating whether user plane integrity protection corresponding to the PDU session identifier is enabled; and determining, by the user plane CU according to the indication, whether to derive a user plane integrity protection key corresponding to the PDU session identifier.

In a possible design, the method further includes: sending, by the control plane CU, the security algorithm to the user plane CU; the performing, by the first base station, security processing on user plane data in the first PDU session by using the first user plane key and a security algorithm includes: performing, by the user plane CU, security processing on the user plane data in the first PDU session by using the first user plane key and the security algorithm; and the performing, by the first base station, security processing on user plane data in the second PDU session by using the second user plane key and the security algorithm includes: performing, by the user plane CU, security processing on the user plane data in the second PDU session by using the second user plane key and the security algorithm.

In a possible design, the method further includes: receiving, by the first base station, a radio resource control (RRC) reestablishment message or an RRC resume message sent by UE, where the RRC reestablishment message or the RRC resume message includes at least one of a UE identity, an original cell identifier, an authentication code shortMAC-I, a control plane CU indication or a user plane CU indication, and a PDU session identifier; and generating, by the first base station, shortMAC-I based on at least one of the UE identity, the original cell identifier, the control plane CU indication or the user plane CU indication, and the PDU session identifier, and determining, by comparing the generated shortMAC-I with the shortMAC-I sent by the UE, whether authentication succeeds.

According to the data security processing method provided in this implementation, the first base station receives the RRC reestablishment message or the RRC resume message sent by the UE, and the first base station generates the shortMAC-I based on at least one of the UE identity, the original cell identifier, the control plane CU indication or the user plane CU indication, and the PDU session identifier, and determines, by comparing the generated shortMAC-I with the shortMAC-I sent by the UE, whether authentication succeeds, thereby implementing data transmission security in an RRC reestablishment or RRC resume scenario.

In a possible design, the method further includes: receiving, by the first base station, a first PDU session identifier and an indication indicating whether user plane integrity protection corresponding to the first PDU session identifier is enabled, where the first PDU session identifier and the indication are sent by a core network; determining, by the first base station according to the indication, whether to derive a user plane integrity protection key corresponding to the first PDU session identifier; receiving, by the first base station, a second PDU session identifier and an indication indicating whether user plane integrity protection corresponding to the second PDU session identifier is enabled, where the second PDU session identifier and the indication are sent by the core network; and determining, by the first base station according to the indication, whether to derive a user plane integrity protection key corresponding to the second PDU session identifier.

According to a second aspect, this application provides a data security processing method, including: sending, by a first base station to a second base station, a target control plane base key, at least one PDU session identifier, and a target user plane base key respectively corresponding to the at least one PDU session identifier, so that the second base station derives a target control plane key based on the target control plane base key and derives a target user plane key based on the target user plane base key, where the target control plane key includes a control plane encryption key and/or a control plane integrity protection key, and the target user plane key includes a user plane encryption key and/or a user plane integrity protection key; where the target control plane base key is derived by the first base station based on a control plane base key and a first parameter, the target user plane base key is derived by the first base station based on a user plane base key and a second parameter, the second parameter is in a one-to-one correspondence with a PDU session identifier, the control plane base key is sent by a core network when a PDU session is set up for the first time, and the user plane base key is sent by the core network when a PDU session is set up.

According to the data security processing method provided in the second aspect, the first base station sends, to the second base station, the target control plane base key, the at least one PDU session identifier, and the target user plane base key respectively corresponding to the at least one PDU session identifier. The second base station derives the target control plane key based on the target control plane base key, and derives the target user plane key based on the target user plane base key, so that the second base station performs security processing on control plane data by using the target control plane key and a target first security algorithm, and performs security processing on user plane data in the PDU session by using the target user plane key and a target second security algorithm, thereby implementing key derivation and exchange in a process in which a source base station is handed over to a target handover base station.

In a possible design, after the sending, by a first base station to a second base station, a target control plane base key, at least one PDU session identifier, and a target user plane base key respectively corresponding to the at least one PDU session identifier, the method further includes:

sending, by the first base station, a target first security algorithm and a target second security algorithm to user equipment UE, where the target first security algorithm and the target second security algorithm are selected by the second base station for the UE based on UE security capability information sent by the first base station, and sent by the second base station to the first base station; and sending, by the first base station, the first parameter and the second parameter to the UE, so that the UE derives the target control plane base key based on a control plane base key of the UE and the first parameter, derives the target user plane base key based on a user plane base key of the UE and the second parameter, derives the target control plane key based on the target control plane base key, derives the target user plane key based on the target user plane base key, performs security processing on control plane data by using the target control plane key and the target first security algorithm, and performs security processing on user plane data in the PDU session by using the target user plane key and the target second security algorithm.

In a possible design, the first base station is a source base station, the second base station is a target handover base station, the first parameter includes at least one of a next-hop chain counter NCC, a target cell identifier, and frequency information, and the second parameter includes at least one of an NCC, a target cell identifier, a PDU session identifier, and frequency information.

According to a third aspect, this application provides a data security processing method, including:

sending, by a first base station to a second base station, at least one PDU session identifier and a target user plane base key respectively corresponding to the at least one PDU session identifier, so that the second base station derives a target user plane key based on the target user plane base key, where the target user plane key includes a user plane encryption key and/or a user plane integrity protection key; where the target user plane base key is derived by the first base station based on a user plane base key and a second parameter, the second parameter is in a one-to-one correspondence with a PDU session identifier, and the user plane base key is sent by a core network when a PDU session is set up.

According to the data security processing method provided in the third aspect, the first base station sends, to the second base station, the at least one PDU session identifier and the target user plane base key respectively corresponding to the at least one PDU session identifier. The second base station derives the target user plane key based on the target user plane base key, so that the second base station performs security processing on the control plane data by using the target control plane key and the target first security algorithm, and performs security processing on the user plane data in the PDU session by using the target user plane key and the target second security algorithm, thereby implementing key derivation and exchange in a DC scenario.

In a possible design, after the sending, by a first base station to a second base station, at least one PDU session identifier and a target user plane base key respectively corresponding to the at least one PDU session identifier, the method further includes: sending, by the first base station, a target second security algorithm to user equipment UE, where the target second security algorithm is selected by the second base station for the UE based on UE security capability information sent by the first base station, and sent by the second base station to the first base station; and sending, by the first base station, the second parameter to the UE, so that the UE derives the target user plane base key based on a user plane base key of the UE and the second parameter, derives the target user plane key based on the target user plane base key, and performs security processing on user plane data corresponding to the PDU session identifier by using the target user plane key and the target second security algorithm.

In a possible design, at the time of the sending, by a first base station to a second base station, at least one PDU session identifier and a target user plane base key respectively corresponding to the at least one PDU session identifier, the method further includes:

sending, by the first base station, a target control plane base key to the second base station, so that the second base station derives a target control plane key based on the target control plane base key, and the target control plane base key is derived by the first base station based on the control plane base key and a first parameter.

In a possible design, after the sending, by the first base station, a target control plane base key to the second base station, the method further includes:

sending, by the first base station, a target first security algorithm to the UE, where the target first security algorithm is selected by the second base station for the UE based on the UE security capability information sent by the first base station, and sent by the second base station to the first base station; and sending, by the first base station, the first parameter to the UE, so that the UE derives the target control plane base key based on a control plane base key of the UE and the first parameter, derives the target control plane key based on the target control plane base key, and performs security processing on control plane data by using the target control plane key and the target first security algorithm.

In a possible design, the first base station is a master base station, the second base station is a secondary base station, the first parameter includes a secondary cell group SCG counter, and the second parameter includes an SCG counter and a PDU session identifier.

In a possible design, the method further includes: sending, by the first base station to the second base station, an indication indicating whether user plane integrity protection corresponding to the PDU session identifier is enabled, so that the second base station determines, according to the indication, whether to derive a user plane integrity protection key corresponding to the PDU session identifier.

According to a fourth aspect, this application provides a data security processing method, including: setting up a PDU session, and receiving, by a control plane centralized unit CU, a user plane base key sent by a core network; deriving, by the control plane CU, a user plane key based on the user plane base key, and sending a PDU session identifier and a user plane key corresponding to the PDU session identifier to a user plane CU, where the user plane key includes a user plane encryption key and/or a user plane integrity protection key; and performing, by the user plane CU, security processing on user plane data in the PDU session by using the user plane key corresponding to the PDU session identifier and a security algorithm; where the control plane CU is connected to the user plane CU through a communications interface.

According to the data security processing method provided in the fourth aspect, the control plane CU receives the user plane base key sent by the core network, and the control plane CU derives the user plane key based on the user plane base key, and sends the PDU session identifier and the user plane key corresponding to the PDU session identifier to the user plane CU. The user plane CU performs security processing on the user plane data in the PDU session by using the user plane key corresponding to the PDU session identifier and the security algorithm, thereby improving data transmission security in a CP-UP separation scenario.

According to a fifth aspect, this application provides a data security processing method, including: setting up a PDU session, and receiving, by a control plane centralized unit CU, a user plane base key sent by a core network; sending, by the control plane CU, a PDU session identifier and a user plane base key corresponding to the PDU session identifier to a user plane CU; deriving, by the user plane CU, a user plane key based on the user plane base key, where the user plane key includes a user plane encryption key and/or a user plane integrity protection key; and performing, by the user plane CU, security processing on user plane data in the PDU session by using a user plane key corresponding to the PDU session identifier and a security algorithm; where the control plane CU is connected to the user plane CU through a communications interface.

According to the data security processing method provided in the fifth aspect, the control plane CU receives the user plane base key sent by the core network, and the control plane CU sends the PDU session identifier and the user plane base key corresponding to the PDU session identifier to the user plane CU. The user plane CU derives the user plane key based on the user plane base key, and finally the user plane CU performs security processing on the user plane data in the PDU session by using the user plane key corresponding to the PDU session identifier and the security algorithm, thereby improving data transmission security in a CP-UP separation scenario.

In a possible design, the method further includes: sending, by the control plane CU to the user plane CU, an indication indicating whether user plane integrity protection corresponding to the PDU session identifier is enabled; and determining, by the user plane CU according to the indication, whether to derive a user plane integrity protection key corresponding to the PDU session identifier.

In a possible design, the method further includes: sending, by the control plane CU to the user plane CU, a security algorithm selected based on user equipment UE security capability information.

According to a sixth aspect, this application provides a base station, including: a key derivation module, configured to: derive a first user plane key based on a received base key when a first protocol data unit PDU session is set up; and a processing module, configured to perform security processing on user plane data in the first PDU session by using the first user plane key and a security algorithm. The key derivation module is further configured to: derive a second user plane key based on the base key when a second PDU session is set up. The processing module is further configured to perform security processing on user plane data in the second PDU session by using the second user plane key and the security algorithm, where the user plane key includes a user plane encryption key and/or a user plane integrity protection key.

In a possible design, the key derivation module is specifically configured to derive the first user plane key based on the base key and a first parameter, where the first parameter is a first PDU session identifier; and derive the second user plane key based on the base key and a second parameter, where the second parameter is a second PDU session identifier.

In a possible design, the base station further includes a sending module, configured to send a target base key and at least one PDU session identifier to a second base station, so that the second base station derives, based on the target base key and the at least one PDU session identifier, a user plane key corresponding to the PDU session identifier, where the target base key is derived by the base station based on the base key and a third parameter.

In a possible design, the sending module is further configured to: after sending the target base key and the at least one PDU session identifier to the second base station, send a target security algorithm to user equipment UE, where the target security algorithm is selected by the second base station for the UE based on UE security capability information sent by the base station, and sent by the second base station to the base station; and send the third parameter and the at least one PDU session identifier to the UE, so that the UE derives the target base key based on a base key of the UE and the third parameter, derives, based on the target base key and the at least one PDU session identifier, the user plane key corresponding to the PDU session identifier, and then performs security processing on user plane data in the PDU session by using the user plane key corresponding to the PDU session identifier and the target security algorithm.

In a possible design, the base station is a source base station, the second base station is a target handover base station, and the third parameter includes at least one of a next-hop chain counter NCC, a target cell identifier, and frequency information.

In a possible design, the base station is a master base station, the second base station is a secondary base station, and the third parameter includes a secondary cell group SCG counter.

In a possible design, the sending module is further configured to send, to the second base station, an indication indicating whether user plane integrity protection corresponding to the PDU session identifier is enabled, so that the second base station determines, according to the indication, whether to derive a user plane integrity protection key corresponding to the PDU session identifier.

In a possible design, the base station includes a centralized unit CU and a distributed unit DU. The CU includes a control plane CU and a user plane CU. The control plane CU is connected to the user plane CU through a communications interface. The key derivation module is specifically configured to: control the control plane CU to derive the first user plane key based on the base key and the first parameter, and send the first parameter and the first user plane key corresponding to the first parameter to the user plane CU.

The key derivation module is specifically configured to: control the control plane CU to derive the second user plane key based on the base key and the second parameter, and send the second parameter and the second user plane key corresponding to the second parameter to the user plane CU.

In a possible design, the base station includes a centralized unit CU and a distributed unit DU. The CU includes a control plane CU and a user plane CU. The control plane CU is connected to the user plane CU through a communications interface. The key derivation module is specifically configured to: control the control plane CU to send the base key and the first parameter to the user plane CU, so that the user plane CU derives the first user plane key based on the base key and the first parameter.

The key derivation module is specifically configured to: control the control plane CU to send the base key and the second parameter to the user plane CU, so that the user plane CU derives the second user plane key based on the base key and the second parameter.

In a possible design, the key derivation module is further configured to: control the control plane CU to send, to the user plane CU, an indication indicating whether user plane integrity protection corresponding to the PDU session identifier is enabled; and control the user plane CU to determine, according to the indication, whether to derive a user plane integrity protection key corresponding to the PDU session identifier.

In a possible design, the processing module is configured to control the control plane CU to send the security algorithm to the user plane CU;

the processing module is configured to control the user plane CU to perform security processing on user plane data in the first PDU session by using the first user plane key and the security algorithm; and the processing module is configured to control the user plane CU to perform security processing on user plane data in the second PDU session by using the second user plane key and the security algorithm.

In a possible design, the base station further includes a first receiving module, configured to receive a radio resource control RRC reestablishment message or an RRC resume message sent by UE, where the RRC reestablishment message or the RRC resume message includes at least one of a UE identity, an original cell identifier, an authentication code shortMAC-I, a control plane CU indication or a user plane CU indication, and a PDU session identifier. The processing module is further configured to generate shortMAC-I based on at least one of the UE identity, the original cell identifier, the control plane CU indication or the user plane CU indication, and the PDU session identifier, and determine, by comparing the generated shortMAC-I with the shortMAC-I sent by the UE, whether authentication succeeds.

In a possible design, the base station further includes a second receiving module, configured to receive a first PDU session identifier and an indication indicating whether user plane integrity protection corresponding to the first PDU session identifier is enabled, where the first PDU session identifier and the indication are sent by a core network. The processing module is further configured to: determine, according to the indication, whether to derive a user plane integrity protection key corresponding to the first PDU session identifier. The second receiving module is further configured to receive a second PDU session identifier and an indication indicating whether user plane integrity protection corresponding to a second PDU session identifier is enabled, where the second PDU session identifier and the indication are sent by the core network. The processing module is further configured to: determine, according to the indication, whether to derive a user plane integrity protection key corresponding to the second PDU session identifier.

For beneficial effects of the base station provided in the sixth aspect and the possible designs of the sixth aspect, refer to the beneficial effects brought by the first aspect and the possible implementations of the first aspect. Details are not described herein again.

According to a seventh aspect, this application provides a base station, including: a sending module, configured to send, to a second base station, a target control plane base key, at least one PDU session identifier, and a target user plane base key respectively corresponding to the at least one PDU session identifier, so that the second base station derives a target control plane key based on the target control plane base key, and derives a target user plane key based on the target user plane base key, where the target control plane key includes a control plane encryption key and/or a control plane integrity protection key, and the target user plane key includes a user plane encryption key and/or a user plane integrity protection key; and a derivation module, configured to derive the target control plane base key based on a control plane base key and a first parameter, and derive the target user plane base key based on a user plane base key and a second parameter, where the second parameter is in a one-to-one correspondence with a PDU session identifier, the control plane base key is sent by a core network when a PDU session is set up for the first time, and the user plane base key is sent by the core network when a PDU session is set up.

In a possible design, the sending module is further configured to: after sending, to the second base station, the target control plane base key, the at least one PDU session identifier, and the target user plane base key respectively corresponding to the at least one PDU session identifier, send a target first security algorithm and a target second security algorithm to user equipment UE, where the target first security algorithm and the target second security algorithm are selected by the second base station for the UE based on UE security capability information sent by the base station, and sent by the second base station to the base station; and send the first parameter and the second parameter to the UE, so that the UE derives the target control plane base key based on a control plane base key of the UE and the first parameter, derives the target user plane base key based on a user plane base key of the UE and the second parameter, derives the target control plane key based on the target control plane base key, derives the target user plane key based on the target user plane base key, performs security processing on control plane data by using the target control plane key and the target first security algorithm, and performs security processing on user plane data in a PDU session by using the target user plane key and the target second security algorithm.

In a possible design, the base station is a source base station, the second base station is a target handover base station, the first parameter includes at least one of a next-hop chain counter NCC, a target cell identifier, and frequency information, and the second parameter includes at least one of an NCC, a target cell identifier, a PDU session identifier, and frequency information.

For beneficial effects of the base station provided in the seventh aspect and the possible designs of the seventh aspect, refer to the beneficial effects brought by the second aspect and the possible implementations of the second aspect. Details are not described herein again.

According to an eighth aspect, this application provides a base station, including: a sending module, configured to send, to a second base station, at least one PDU session identifier and a target user plane base key respectively corresponding to the at least one PDU session identifier, so that the second base station derives a target user plane key based on the target user plane base key, where the target user plane key includes a user plane encryption key and/or a user plane integrity protection key; and a derivation module, configured to derive the target user plane base key based on a user plane base key and a second parameter, where the second parameter is in a one-to-one correspondence with the PDU session identifier, and the user plane base key is sent by a core network when a PDU session is set up.

In a possible design, the sending module is further configured to: after sending, to the second base station, the at least one PDU session identifier and the target user plane base key respectively corresponding to the at least one PDU session identifier, send a target second security algorithm to user equipment UE, where the target second security algorithm is selected by the second base station for the UE based on UE security capability information sent by the base station, and sent by the second base station to the base station; and send the second parameter to the UE, so that the UE derives the target user plane base key based on a user plane base key of the UE and the second parameter, derives the target user plane key based on the target user plane base key, and performs security processing on user plane data corresponding to the PDU session identifier by using the target user plane key and the target second security algorithm.

In a possible design, the sending module is further configured to: when sending, to the second base station, the at least one PDU session identifier and the target user plane base key respectively corresponding to the at least one PDU session identifier, send a target control plane base key to the second base station, so that the second base station derives a target control plane key based on the target control plane base key, where the target control plane base key is derived by the base station based on a control plane base key and a first parameter.

In a possible design, the sending module is further configured to: after sending the target control plane base key to the second base station, send a target first security algorithm to the UE, where the target first security algorithm is selected by the second base station for the UE based on the UE security capability information sent by the base station, and sent by the second base station to the base station; and send the first parameter to the UE, so that the UE derives the target control plane base key based on a control plane base key of the UE and the first parameter, derives the target control plane key based on the target control plane base key, and performs security processing on control plane data by using the target control plane key and the target first security algorithm.

In a possible design, the base station is a master base station, the second base station is a secondary base station, the first parameter includes an SCG counter, and the second parameter includes an SCG counter and a PDU session identifier.

In a possible design, the sending module is further configured to send, to the second base station, an indication indicating whether user plane integrity protection corresponding to the PDU session identifier is enabled, so that the second base station determines, according to the indication, whether to derive a user plane integrity protection key corresponding to the PDU session identifier.

For beneficial effects of the base station provided in the eighth aspect and the possible designs of the eighth aspect, refer to the beneficial effects brought by the third aspect and the possible implementations of the third aspect. Details are not described herein again.

According to a ninth aspect, this application provides a base station, including a centralized unit CU and a distributed unit DU, where the CU includes a control plane CU and a user plane CU, and the control plane CU is connected to the user plane CU through a communications interface;

the control plane CU is configured to:

when a PDU session is set up, receive a user plane base key sent by a core network;

derive a user plane key based on the user plane base key; and send a PDU session identifier and a user plane key corresponding to the PDU session identifier to the user plane CU, where the user plane key includes a user plane encryption key and/or a user plane integrity protection key; and the user plane CU is configured to perform security processing on user plane data in the PDU session by using the user plane key corresponding to the PDU session identifier and a security algorithm.

For beneficial effects of the base station provided in the ninth aspect and the possible designs of the ninth aspect, refer to the beneficial effects brought by the fourth aspect and the possible implementations of the fourth aspect. Details are not described herein again.

According to a tenth aspect, this application provides a base station, including a centralized unit CU and a distributed unit DU, where the CU includes a control plane CU and a user plane CU, and the control plane CU is connected to the user plane CU through a communications interface;

the control plane CU is configured to: when a PDU session is set up, receive a user plane base key sent by a core network; and send a PDU session identifier and a user plane base key corresponding to the PDU session identifier to the user plane CU; and the user plane CU is configured to derive a user plane key based on the user plane base key, where the user plane key includes a user plane encryption key and/or a user plane integrity protection key; and perform security processing on user plane data in the PDU session by using the user plane key corresponding to the PDU session identifier and the security algorithm.

In a possible design, the control plane CU is further configured to send, to the user plane CU, an indication indicating whether user plane integrity protection corresponding to the PDU session identifier is enabled; and the user plane CU is further configured to determine, according to the indication, whether to derive a user plane integrity protection key corresponding to the PDU session identifier.

In a possible design, the control plane CU is further configured to send, to the user plane CU, a security algorithm selected based on user equipment UE security capability information.

For beneficial effects of the base station provided in the tenth aspect and the possible designs of the tenth aspect, refer to the beneficial effects brought by the fifth aspect and the possible implementations of the fifth aspect. Details are not described herein again.

According to an eleventh aspect, this application provides a base station, including a memory, a processor, and a transceiver, where the memory, the processor, and the transceiver communicate with each other by using a bus;

the transceiver is used by the base station to perform data receiving/sending with the external;

the memory stores a program instruction; and the processor invokes the program instruction stored in the memory, so as to perform an operation on a base station in the data security processing method according to the first aspect and any possible design of the first aspect, the second aspect and any possible design of the second aspect, the third aspect and any possible design of the third aspect, the fourth aspect and any possible design of the fourth aspect, or the fifth aspect and any possible design of the fifth aspect.

According to a twelfth aspect, this application provides a system chip, applied to a base station, and the system chip includes an input/output interface, at least one processor, a memory, and a bus;

the input/output interface, the at least one processor, and the memory communicate with each other by using the bus, the memory stores a program instruction, and the input/output interface is used by the system chip to perform data receiving/sending with the external; and the at least one processor invokes the program instruction stored in the memory, so as to perform an operation on a base station in the data security processing method according to the first aspect and any possible design of the first aspect, the second aspect and any possible design of the second aspect, the third aspect and any possible design of the third aspect, the fourth aspect and any possible design of the fourth aspect, or the fifth aspect and any possible design of the fifth aspect.

According to a thirteenth aspect, this application provides a computer program product, applied to a base station, where the computer program product includes an instruction, and when the instruction is executed by a computing apparatus, an operation on a base station in the data security processing method according to the first aspect and any possible design of the first aspect, the second aspect and any possible design of the second aspect, the third aspect and any possible design of the third aspect, the fourth aspect and any possible design of the fourth aspect, or the fifth aspect and any possible design of the fifth aspect is performed.

According to a fourteenth aspect, this application provides a computer readable storage medium, applied to a base station, where the computer readable storage medium includes an instruction, and when the instruction is executed by a computing apparatus, an operation on a base station in the data security processing method according to the first aspect and any possible design of the first aspect, the second aspect and any possible design of the second aspect, the third aspect and any possible design of the third aspect, the fourth aspect and any possible design of the fourth aspect, or the fifth aspect and any possible design of the fifth aspect is performed.

DESCRIPTION OF EMBODIMENTS

Figure 1:
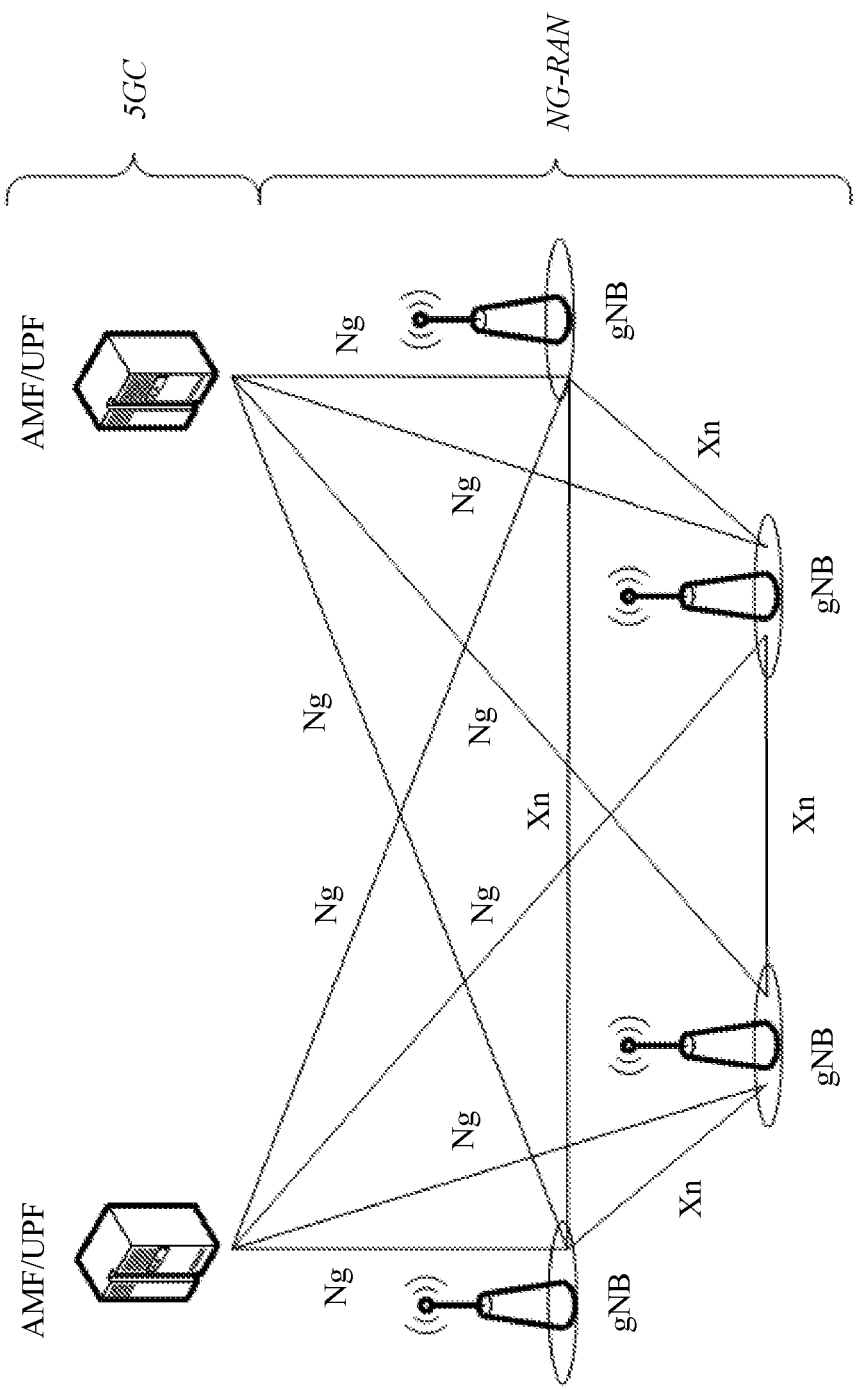
FIG. 1 is a schematic diagram of a network architecture of a 5G system.

Network architectures and service scenarios described in this application are intended to describe the technical solutions in this application clearly, but are not intended to limit the technical solutions provided in this application. A person of ordinary skill in the art may know that as the network architectures evolve and a new service scenario emerges, the technical solutions provided in this application are also applicable to a similar technical problem.

The technical solutions of this application may be applied to a mobile communications system such as a 5th generation mobile communications (the 5th Generation mobile communication technology, 5G) system or an LTE system, and may also be applied to various forms of systems in which functions of a base station are separated. In a communications system to which this application is applied, related network elements include a base station (also referred to as an access network device) and UE (also referred to as a terminal device).

In the following, some terms in this application are described, so as to help a person skilled in the art have a better understanding.

1. In the embodiments of this application, the term "terminal device" or "UE" includes but is not limited to a mobile station, a fixed or mobile subscriber unit, a pager, a cellular phone, a personal digital assistant (Personal Digital Assistant, PDA), a computer or any other type of UE that can work in a wireless environment.

2. The term "base station" includes but is not limited to a base station, a node, a station controller, an access point (Access Point, AP), a remote node (Remote Unit, RU), or any other type of interface device that can work in a wireless environment.

3. A base key is a key sent by a core network to a base station (a network-side base key (KeNB) generated by the core network), or a key sent by a source base station to a target handover base station, or a key sent by a master base station to a secondary base station.

4. A control plane key includes KRRCenc and KRRCint, KRRCenc is used for encryption and decryption, and KRRCint is used for integrity protection; and a user plane key includes KUPenc and KUPint, KUPenc is used for encryption and decryption, and KUPint is used for integrity protection.

The technical solutions of this application are mainly applied to a security authentication process between a base station and UE. To improve data transmission security, each time a PDU session is set up, the base station and the UE derive a user plane key based on a base key or a user plane base key, implementing key generation and exchange at a PDU session granularity, and implementing key derivation and exchange in a scenario in which a control plane CU is separated from a user plane CU, in a dual-connectivity (Dual-connectivity, DC) scenario, in an RRC reestablishment scenario, in a handover (Handover, HO) scenario, and the like in a 5G system. With reference to the accompanying drawings, the following describes in detail a network architecture of this application, a CU-DU separation scenario, a DC scenario, an RRC reestablishment scenario, and an HO scenario that are related to this application.

FIG. 1 is a schematic diagram of a network architecture of a 5G system. In the 5G system, in a next generation radio access network (Next Generation Radio Access Network, NG-RAN), a core network is a 5G core network (5G Core Network, 5GC), and a base station is referred to as a gNB/ng-eNB, and mainly includes an RRC/service data adaptation protocol layer (Service Data Adaptation Protocol, SDAP)/PDCP/radio link control (Radio Link Control, RLC)/medium access control (Medium Access Control, MAC)/physical layer (Physical Layer, PHY) protocol layer. In the following and in FIG. 1, a gNB is used to represent a base station in the 5G system. gNBs are connected to each other through an Xn interface, and the gNB and the 5GC are connected to each other through an Ng interface. An access and mobility management function (Access and Mobility management Function, AMF)/a user plane function (User Plane Function, UPF) is equivalent to an MME in an LTE system. The AMF is mainly responsible for admission, and the UPF is mainly responsible for session (session) management.

It should be understood that the character "/" in this application indicates an "or" relationship between associated objects.

Figure 2:
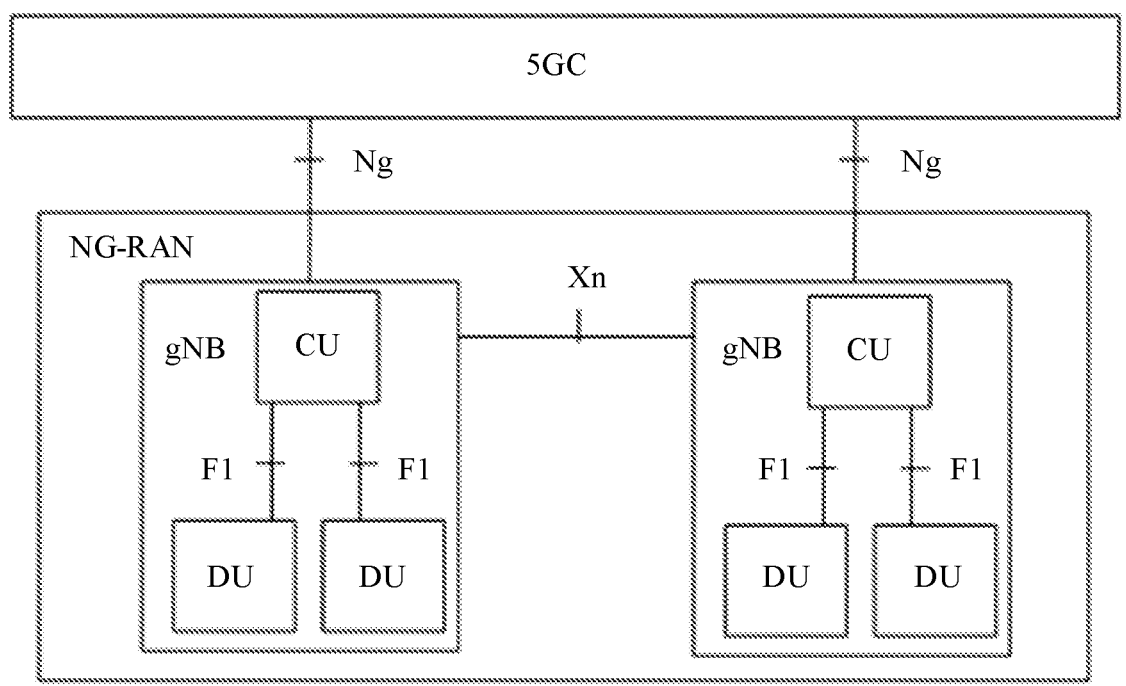
FIG. 2 is a schematic diagram of CU-DU division in a 5G system.
Figure 3:
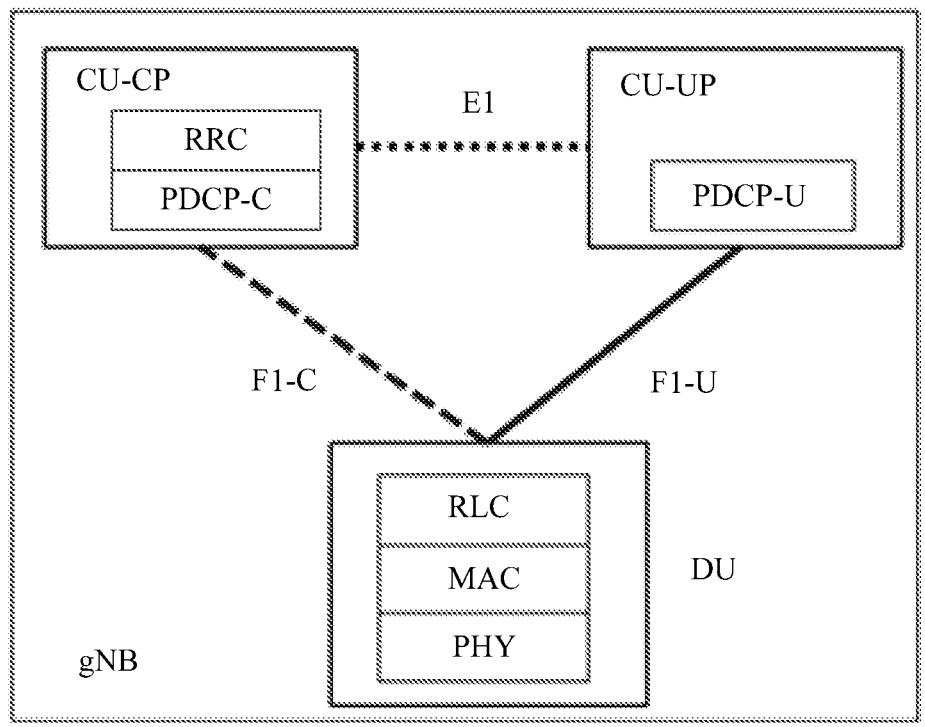
FIG. 3 is a schematic diagram of CU division.

The following describes the CU-DU separation scenario with reference to FIG. 2 and FIG. 3. FIG. 2 is a schematic diagram of CU-DU division in a 5G system. As shown in FIG. 2, a base station may include a centralized unit (Centralized Unit, CU) and a distributed unit (Distributed Unit, DU). That is, functions of a base station in an original access network are separated, some functions of the base station are deployed on one CU, and a remaining function is deployed on the DU, and a plurality of DUs share one CU. Therefore, costs can be reduced, and network extension is easy. The CU is connected to the DU through an F1 interface, and on behalf of a gNB, the CU is connected to a core network through an Ng interface. CU-DU division may be performed by a protocol stack. In a possible manner, RRC and PDCP layers are deployed on the CU, and remaining RLC layer, MAC layer, and PHY layer are deployed on the DU. Still further, the CU may be further divided into a control plane CU (CU-CP) and a user plane CU (CU-UP). FIG. 3 is a schematic diagram of CU division. As shown in FIG. 3, the CU-CP and the CU-UP are connected through an E1 interface. On behalf of the gNB, the CU-CP is connected to the core network through the Ng interface, the CU-CP is connected to the DU through F1-C (control plane), and the CU-UP is connected to the DU through F1-U (user plane). Another possible implementation is that a PDCP-C is also in the CU-UP. The CU-CP is responsible for a control plane function, and mainly includes RRC and a control plane packet data convergence protocol (Packet Data Convergence Protocol-Control, PDCP-C). The PDCP-C is mainly responsible for encryption and decryption, integrity protection, data transmission, and the like of control plane data. The CU-UP is responsible for a user plane function, and mainly includes the SDAP and a user plane PDCP (PDCP-U). The SDAP is mainly responsible for processing data of the core network and mapping a data flow (flow) to a bearer. The PDCP-U is mainly responsible for encryption and decryption, integrity protection, header compression, serial number maintenance, data transmission, and the like of a data plane.

Figure 4A:
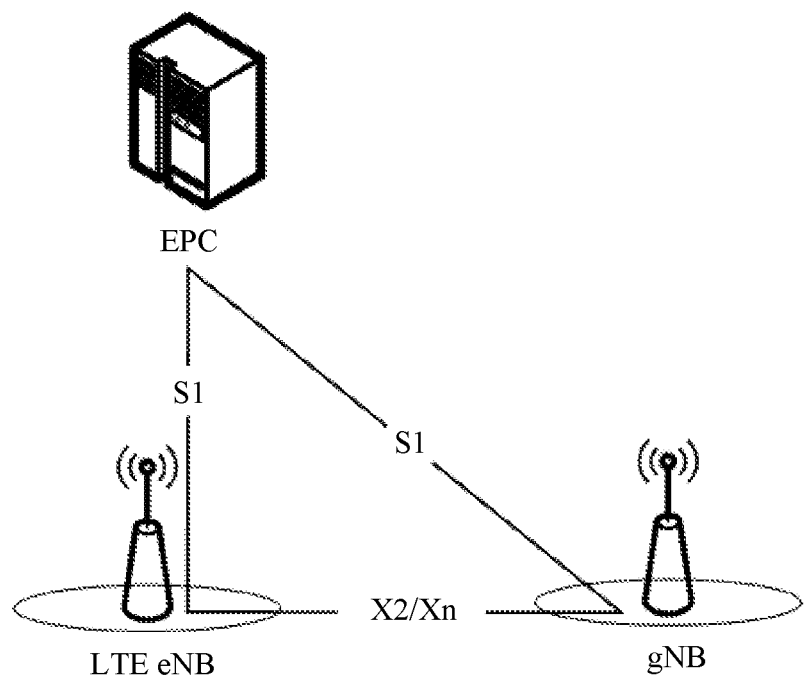
FIG. 4a to FIG. 4d are schematic diagrams of four architectures in which dual connectivity is implemented between LTE and NR.
Figure 4B:
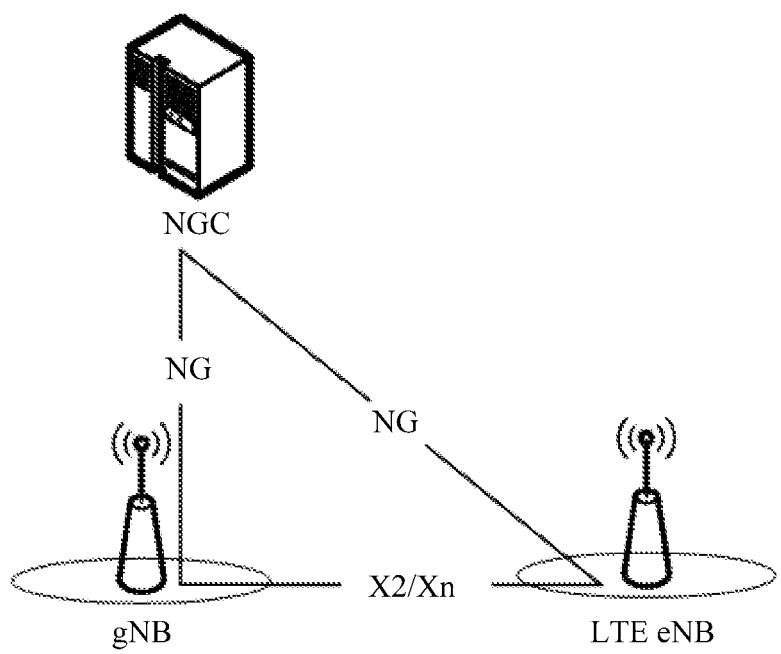
Figure 4C:
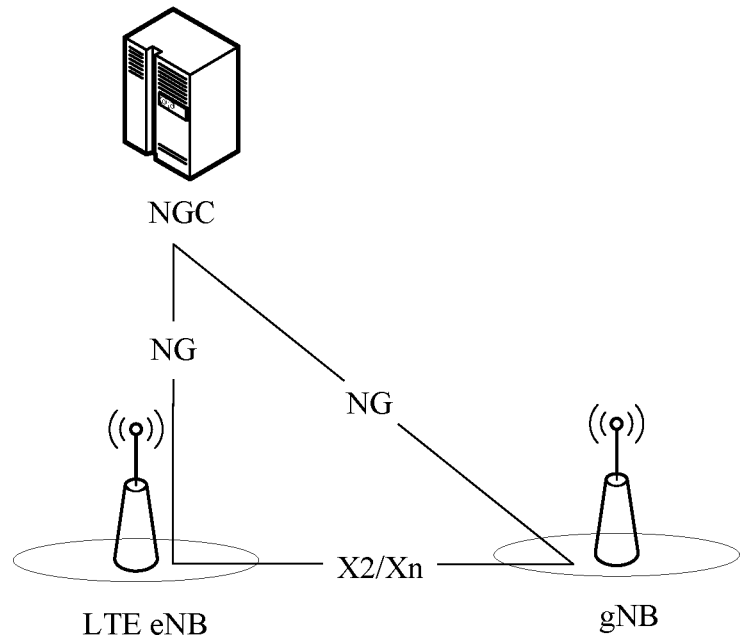
Figure 4D:
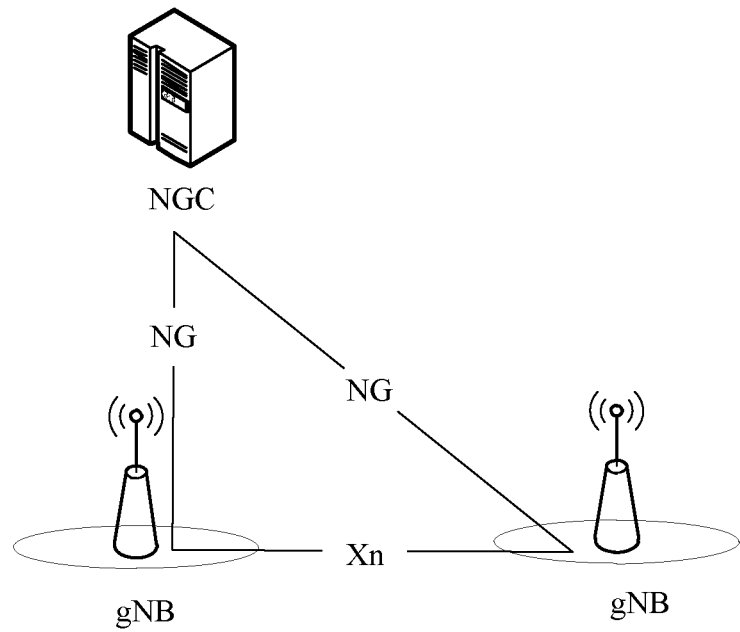
Figure 5:
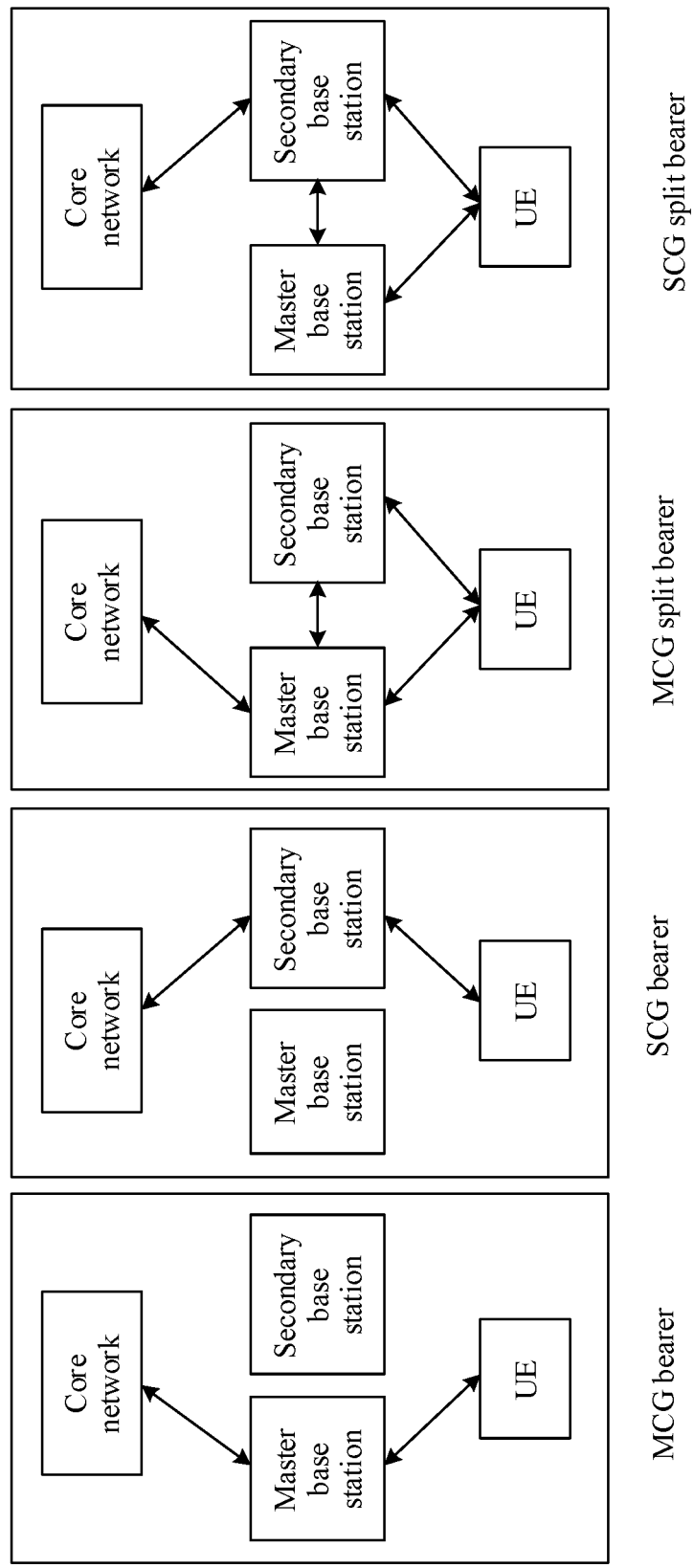
FIG. 5 is a schematic diagram of an MCG bearer, an SCG bearer, an MCG split bearer, and an SCG split bearer.

The following describes the DC scenario with reference to FIG. 4a to FIG. 5. When DC is implemented between LTE and new radio (New Radio, NR), UE may simultaneously obtain radio resources from LTE and an NR air interface for data transmission, to obtain a gain of a transmission rate. FIG. 4a to FIG. 4d are schematic diagrams of four architectures in which dual-connectivity is implemented between LTE and NR. A core network in FIG. 4a is an evolved packet core (Evolved Packet Core, EPC) of an LTE system. As a master base station (Master Node, MeNB, referred to as MN in 5G), an LTE eNB may establish a control plane connection and a user plane connection to the EPC for UE. As a secondary base station (Secondary Node, SeNB, referred to as SN in 5G), a gNB can establish only a user plane connection to the EPC. The EPC is connected to the gNB through an S1 interface, the EPC is connected to the eNB through the S1 interface, and the eNB is connected to the gNB through an X2/Xn interface. A core network in FIG. 4b is a (Next Generation Core network, NGC) (or referred to as a 5GC). As a master base station, a gNB may establish a control plane connection and a user plane connection to the NGC for UE. As a secondary base station, an LTE eNB can establish only a user plane connection to the NGC. The NGC is connected to the gNB through an NG interface, the NGC is connected to the eNB through the NG interface, and the eNB is connected to the gNB through an X2/Xn interface. A core network in FIG. 4c is an NGC. As a master base station, an LTE eNB may establish a control plane connection and a user plane connection to the NGC for UE. As a secondary base station, a gNB can establish only a user plane connection to the NGC. The NGC is connected to the gNB through an NG interface, the NGC is connected to the eNB through the NG interface, and the eNB is connected to the gNB through an X2/Xn interface. A core network in FIG. 4d is an NGC. As a master base station, a first gNB may establish a control plane connection and a user plane connection to the NGC for UE. As a secondary base station, a second gNB can establish only a user plane connection to the NGC. The NGC is connected to the first gNB through an NG interface, the NGC is connected to the second gNB through the NG interface, and the gNBs are connected to each other through an Xn interface.

FIG. 4a is used as an example. Bearer types include a master cell group (Master Cell Group, MCG) bearer, a secondary cell group (Secondary Cell Group, SCG) bearer, an MCG split bearer, and an SCG split bearer. FIG. 5 is a schematic diagram of the MCG bearer, the SCG bearer, the MCG split bearer, and the SCG split bearer. As shown in FIG. 5, a master base station is referred to as a master base station, and a secondary base station is referred to as a secondary base station. All data of the MCG bearer is sent by the master base station to UE. All data of the SCG bearer is sent by the secondary base station to the UE. Data of the MCG split bearer is sent from a core network to the master base station, the master base station offloads the data at a PDCP layer and sends some data to the secondary base station, the secondary base station sends the data to the UE, and remaining data is sent by the master base station to the UE. Data of the SCG split bearer is sent from the core network to the secondary base station, the secondary base station offloads the data at the PDCP layer and sends some data to the master base station, the master base station sends the data to the UE, and remaining data is sent by the secondary base station to the UE.

The following describes the RRC reestablishment scenario. After a radio link failure occurs on UE, an RRC reestablishment procedure is initiated. The UE sends an RRC reestablishment request message to a base station. The RRC reestablishment request message includes a cell radio network temporary identifier (Cell Radio Network Temporary Identifier, C-RNTI), an original cell physical cell identifier (Physical Cell Identity, PCI), and an authentication code (shortMAC-I). The shortMAC-I is used to authenticate validity of the RRC reestablishment message. Input parameters of the ShortMAC-I include KRRCint and authentication code input parameters (VarShort MAC-Input) that include a Cell ID, a PCI, and a C-RNTI. The Cell ID is a target cell identifier, and the PCI is an identifier of an originally connected cell before the radio link failure. An eNB to which the UE is reconnected may derive shortMAC-I based on the C-RNTI, the PCI, and the like that are provided by the UE, and with reference to existing information of the eNB (for example, the UE is connected to the original eNB, or the information is obtained from the original eNB by using an HO preparation procedure or a radio link failure indication), so as to verify validity of the UE. For an RRC resume scenario, after entering an inactive (inactive) state, the UE initiates an RRC resume procedure. Compared with RRC reestablishment, the only difference lies in that the user identifier C-RNTI is replaced by a resume A-RNTI. Other descriptions are the same, and details are not described again.

The following uses an attach (Attach) process as an example to describe a security authentication process between a base station and UE in an LTE system. First, a security mode command (Security Mode Command, SMC) process of non-access stratum security (security) is mainly used by an MME and the UE to separately generate a non-access stratum encryption key and a non-access stratum integrity protection key, and then the MME generates a network-side air interface protection key (KeNB for short) and sends the KeNB and UE security capability information to the eNB by using an initial context setup request (Initial Context Setup Request). The eNB selects a proper security algorithm (encryption algorithm and integrity protection algorithm) based on the UE security capability information and a security capability of the base station. An SMC process of access stratum security is used by the eNB and the UE to negotiate a security algorithm, and separately generate a control plane key and a user plane key. A specific process is as follows: The eNB derives a user plane key (KUPenc and KUPint) and a control plane key—RRC signaling protection key (KRRCenc and KRRCint, where the former is used for encryption and decryption, and the latter is used for integrity protection) of the access stratum based on the KeNB. The security algorithm includes an encryption algorithm and an integrity protection algorithm. When the eNB derives the user plane key (KUPenc and KUPint) and the RRC signaling protection key (KRRCenc and KRRCint) of the access stratum based on the KeNB, a key derivation algorithm is used. In the LTE system, the algorithm is specified by a protocol and does not need to be negotiated. When encryption or integrity protection is performed on data or an RRC message based on the user plane key or the control plane key, an algorithm used is an encryption algorithm or an integrity protection algorithm. The encryption algorithm and the integrity protection algorithm need to be selected by the eNB based on a security algorithm supported by the UE that is included in the UE security capability information and a security algorithm supported by the eNB. Finally, the UE performs encryption and/or integrity protection on user plane data and the RRC message based on the encryption algorithm and the integrity protection algorithm that are selected by the eNB, the user plane key (KUPenc and KUPint), and the control plane key—RRC signaling protection key (KRRCenc and KRRCint).

The following briefly describes a relationship between a PDU session and both a data flow (flow) and a data radio bearer (Data radio bearer, DRB). Quality of service (QoS) management in an LTE system is on a DRB basis, and QoS management in a 5G system is on a QoS flow basis. That is, data from an NGC is differentiated for different flows. The NGC sets up at least one PDU session with a base station. Each PDU session includes at least one QoS flow. The base station maps one or more QoS flows to one DRB, and each DRB is corresponding to at least one QoS flow. Therefore, one PDU session may be corresponding to a plurality of DRBs. Therefore, there is a requirement for implementing key generation and exchange at a DRB granularity. This application may further implement key generation and exchange at a DRB granularity.

In a security authentication process between the base station and the UE, data transmission security of a method used in the prior art is not high. This application provides a data security processing method and an apparatus. To improve data transmission security, each time a PDU session is set up, the base station and the UE derive a user plane key based on KeNB, so as to implement generation and exchange of a user plane key at a PDU session granularity. The following describes in detail the technical solutions of this application with reference to the accompanying drawings.

Figure 6:
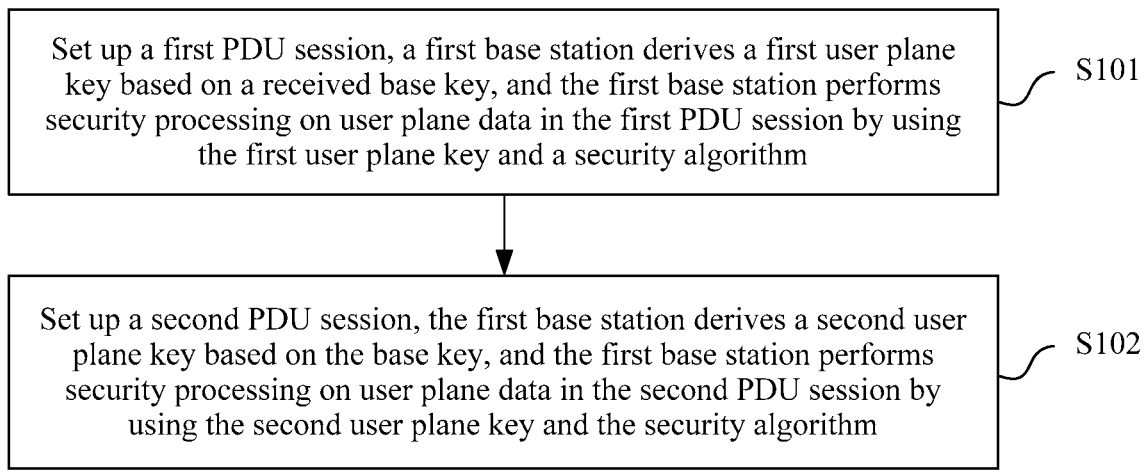
FIG. 6 is a flowchart of an embodiment of a data security processing method according to this application.

FIG. 6 is a flowchart of an embodiment of a data security processing method according to this application. As shown in FIG. 6, the method in this embodiment may include the following steps.

S101. Set up a first PDU session, a first base station derives a first user plane key based on a received base key, and the first base station performs security processing on user plane data in the first PDU session by using the first user plane key and a security algorithm.

The base key is a network-side base key (KgNB) generated by a core network, and the core network (for example, an AMF network element) sends the base key to the first base station, and may further send UE security capability information. The user plane key includes a user plane encryption key and/or a user plane integrity protection key.

Specifically, that the first base station derives the first user plane key based on the received base key in S101 may be as follows: The first base station derives the first user plane key based on the base key and a first parameter, where the first parameter is a first PDU session identifier. The first base station derives the first user plane key based on the base key, the first PDU session identifier, and a key derivation algorithm. It should be noted that the key derivation algorithm for deriving the first user plane key by the first base station based on the base key may be specified in a protocol and does not need to be negotiated. Alternatively, the key derivation algorithm may be obtained through negotiation. For example, UE adds a key derivation algorithm (which may be extended to a control plane key derivation algorithm and a user plane key derivation algorithm) supported by the UE to the UE security capability information. Then, the first base station may finally select a proper key derivation algorithm or a control plane key derivation algorithm and a user plane key derivation algorithm based on the key derivation algorithm supported by the UE and a key derivation algorithm supported by the first base station.

That the first base station performs security processing on the user plane data in the first PDU session by using the first user plane key and the security algorithm may specifically include the following:

The first base station selects a proper security algorithm based on the UE security capability information and a security algorithm supported by the first base station, where the security algorithm includes an encryption algorithm and an integrity protection algorithm. Further, the security algorithm may alternatively include a control plane security algorithm and a user plane security algorithm. The control plane security algorithm includes a control plane encryption algorithm and a control plane integrity protection algorithm, and the user plane security algorithm includes a user plane encryption algorithm and a user plane integrity protection algorithm. Then, the first base station performs security processing on the user plane data in the first PDU session by using the first user plane key and the security algorithm or the user plane security algorithm. On a UE side, the first base station sends the selected security algorithm or the control plane security algorithm and the user plane security algorithm to the UE, and may further send the first PDU session identifier, a next-hop chain counter (Next HopChaining Count, NCC), and the like. For example, the UE is notified by the first base station by using an SMC message or an RRC reconfiguration message. The UE derives the first user plane key based on the base key and the first PDU session identifier by using the key derivation algorithm or the user plane key derivation algorithm (specified in the protocol or provided by the first base station). Finally, the UE performs security processing on the user plane data in the first PDU session by using the first user plane key and the security algorithm or the user plane security algorithm.

S102. Set up a second PDU session, the first base station derives a second user plane key based on the base key, and the first base station performs security processing on user plane data in the second PDU session by using the second user plane key and the security algorithm.

Specifically, that the first base station derives the second user plane key based on the base key in S102 may be as follows: The first base station derives the second user plane key based on the base key and a second parameter, where the second parameter is a second PDU session identifier.

That the first base station performs security processing on the user plane data in the second PDU session by using the second user plane key and the security algorithm may specifically include the following:

The first base station selects a proper security algorithm based on the UE security capability information and the security algorithm supported by the first base station, where the security algorithm includes the encryption algorithm and the integrity protection algorithm. Further, the security algorithm may alternatively include a control plane security algorithm and a user plane security algorithm. The control plane security algorithm includes a control plane encryption algorithm and a control plane integrity protection algorithm, and the user plane security algorithm includes a user plane encryption algorithm and a user plane integrity protection algorithm. Then, the first base station performs security processing on the user plane data in the second PDU session by using the second user plane key and the security algorithm or the user plane security algorithm. On the UE side, the first base station sends the selected security algorithm or the control plane security algorithm and the user plane security algorithm to the UE, and may further send the second PDU session identifier, a next-hop chain counter, and the like. For example, the UE is notified by the first base station by using an SMC message or an RRC reconfiguration message. The UE derives the second user plane key based on the base key and the second PDU session identifier by using the key derivation algorithm or the user plane key derivation algorithm (specified in the protocol or provided by the first base station). Finally, the UE performs security processing on the user plane data in the second PDU session by using the second user plane key and the security algorithm or the user plane security algorithm.

When the user plane key includes the user plane encryption key and the user plane integrity protection key, further, the method further includes the following:

The first base station receives a first PDU session identifier and an indication indicating whether user plane integrity protection corresponding to the first PDU session identifier is enabled, where the first PDU session identifier and the indication are sent by the core network. The first base station determines, according to the indication, whether to derive a user plane integrity protection key corresponding to the first PDU session identifier and whether to use the integrity protection key to perform user plane integrity protection on user plane data corresponding to the first PDU session identifier. In another possible case, the first base station receives the first PDU session identifier, a QoS flow list included in the first PDU session, and an indication indicating whether user plane integrity protection corresponding to each QoS flow identifier is enabled, where the first PDU session identifier, the QoS flow list included in the first PDU session, and the indication are sent by the core network. The first base station derives the user plane integrity protection key corresponding to the first PDU session identifier, and subsequently determines, according to the indication indicating whether user plane integrity protection corresponding to the QoS flow identifier is enabled, whether to use the user plane integrity protection key to perform integrity protection on user plane data corresponding to the QoS flow identifier. For example, the first PDU session includes five QoS flows, user plane integrity protection of a QoS flow 3 is enabled, and user plane integrity protection of other QoS flows is disabled. The first base station derives the user plane integrity protection key corresponding to the first PDU session, and then determines, according to the indication, whether to perform integrity protection on user plane data of the QoS flow. For another example, the first PDU session includes five QoS flows, and user plane integrity protection of all QoS flows is disabled. Then, after the first base station derives the user plane integrity protection key corresponding to the first PDU session, the first base station does not perform integrity protection on user plane data corresponding to any QoS flow. Alternatively, the first base station derives the user plane integrity protection key corresponding to the first PDU session identifier only when at least one of indications indicating whether user plane integrity protection corresponding to the QoS flow list included in the first PDU session is enabled indicates that user plane integrity protection is enabled. Subsequently, integrity protection is performed only on user plane data corresponding to a QoS flow identifier for which user plane integrity protection is indicated to be enabled. For example, the first PDU session includes five QoS flows, user plane integrity protection of a QoS flow 3 is indicated to be enabled, and user plane integrity protection of other QoS flows is indicated to be disabled. The first base station derives the user plane integrity protection key, and then determines, according to the indication, whether to perform integrity protection on user plane data of the QoS flow. For another example, the first PDU session includes five QoS flows, and user plane integrity protection of all QoS flows is indicated to be disabled. Then, the first base station determines not to derive the user plane integrity protection key corresponding to the first PDU session.

The first base station receives a second PDU session identifier and an indication indicating whether user plane integrity protection corresponding to the second PDU session identifier is enabled, where the second PDU session identifier and the indication are sent by the core network. The first base station determines, according to the indication, whether to derive a user plane integrity protection key corresponding to the second PDU session identifier. In another possible case, the first base station receives the second PDU session identifier, a QoS flow list included in the first PDU session, and an indication indicating whether user plane integrity protection corresponding to each QoS flow identifier is enabled, where the second PDU session identifier, the QoS flow list included in the first PDU session, and the indication are sent by the core network. When the first base station receives the second PDU session identifier and the indication indicating whether user plane integrity protection is enabled, an operation performed by the first base station is the same as an operation performed when the first base station receives the first PDU session identifier and the indication indicating whether user plane integrity protection is enabled.

That is, the core network sends, to the first base station, a PDU session identifier and an indication indicating whether user plane integrity protection corresponding to the PDU session identifier is enabled. If the indication indicates that user plane integrity protection corresponding to the PDU session identifier is "enabled", the first base station derives a user plane integrity protection key corresponding to the PDU session identifier according to the received indication. If the indication indicates that user plane integrity protection corresponding to the PDU session identifier is "disabled", the first base station does not need to derive the user plane integrity protection key corresponding to the PDU session identifier. Optionally, the indication indicating whether user plane integrity protection is enabled is nonrestrictive, and may be extended to an indication indicating whether control plane encryption, control plane integrity protection, user plane encryption, and user plane integrity protection are enabled. An integrity protection key is referred to as integrity protection. For example, when setting up a PDU session for UE for the first time, the core network provides KgNB, UE security capability information, and an indication indicating whether user plane integrity protection is enabled. Each time setting up a PDU session, the core network may further provide indications indicating whether control plane integrity protection of the PDU session is enabled, whether control plane encryption of the PDU session is enabled, and whether user plane encryption of the PDU session is enabled. All the foregoing indications may be extended to be at a QoS flow granularity, that is, each QoS flow identifier is corresponding to an indication indicating whether control plane encryption is enabled, an indication indicating whether control plane integrity protection is enabled, an indication indicating whether user plane encryption is enabled, or an indication indicating whether user plane integrity protection is enabled.

According to the data security processing method provided in this embodiment, each time a PDU session is set up, the first base station derives a user plane key based on the base key and a PDU session identifier of the PDU session, and performs security processing on user plane data in the PDU session by using the derived user plane key and the security algorithm. Different PDU sessions use different user plane keys, thereby improving data transmission security.

Figure 7:
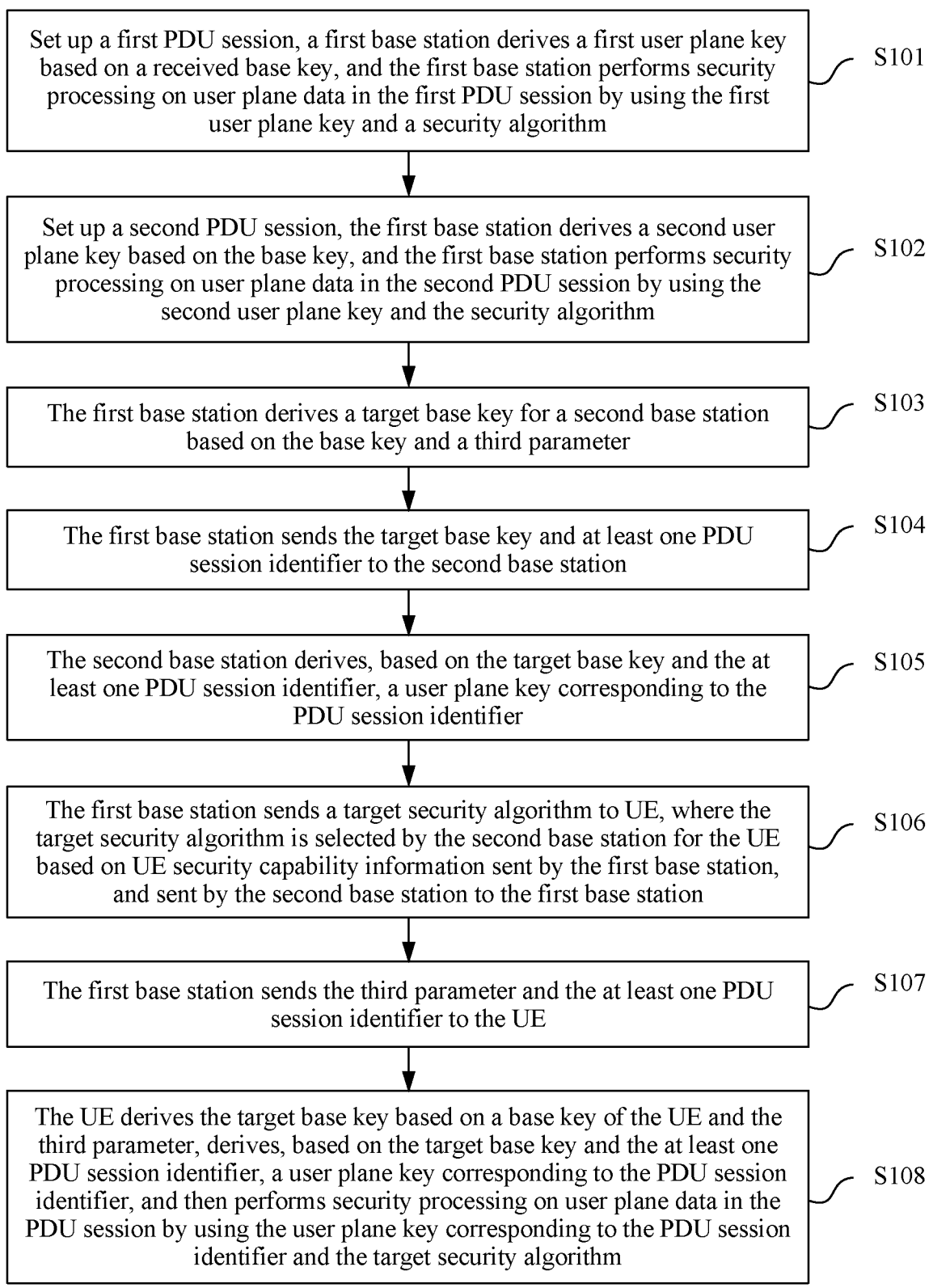
FIG. 7 is a flowchart of an embodiment of another data security processing method according to this application.

Further, after a PDU session is set up between the first base station and the UE, the UE may be handed over from a source base station to a target handover base station. In this case, how to derive the user plane key is described below. FIG. 7 is a flowchart of an embodiment of another data security processing method according to this application. As shown in FIG. 7, the method in this embodiment may further include the following steps based on the method shown in FIG. 6.

S103. The first base station derives a target base key for a second base station based on the base key and a third parameter.

The first base station is a source base station, and the second base station is a target handover base station. Specifically, when the first base station decides to perform a handover action for the UE, the first base station derives the target base key for the second base station based on the base key and the third parameter. The third parameter includes at least one of an NCC, a target cell identifier, and frequency information.

S104. The first base station sends the target base key and at least one PDU session identifier to the second base station.

Optionally, that the first base station further sends at least one of the UE security capability information, the target cell identifier, the frequency information, and the key derivation algorithm to the second base station may further include the following: The first base station sends, to the second base station, an indication indicating whether user plane integrity protection corresponding to the PDU session identifier is enabled, so that the second base station determines, according to the indication, whether to derive a user plane integrity protection key corresponding to the PDU session identifier. In addition, in one case, the first base station receives the indication that is sent by the core network and that indicates whether user plane integrity protection corresponding to the PDU session identifier is enabled, and the first base station may further send, to the second base station, an indication indicating whether a user plane encryption key corresponding to the PDU session identifier is enabled. In another case, the first base station receives an indication that is sent by the core network and that indicates whether user plane integrity protection corresponding to a QoS flow identifier in a PDU session is enabled, and the first base station may further send, to the second base station, an indication indicating whether user plane integrity protection corresponding to the QoS flow identifier corresponding to the PDU session identifier is enabled. For the two cases, if the first base station maps one or more QoS flows to a DRB according to a specific principle, the first base station may further send, to the second base station, an indication indicating whether user plane integrity protection corresponding to a DRB identifier is enabled. The indication may further be extended to an indication indicating whether control plane encryption is enabled, an indication indicating whether control plane integrity protection is enabled, an indication indicating whether user plane encryption is enabled, or an indication indicating whether user plane integrity protection is enabled.

The foregoing information may be included in a handover request (Handover request) message sent by the first base station to the second base station, for example, the handover request includes information in the following form:

| | |
|---|---|
| >Target Cell ID | Target cell identifier |
| > carrier Freq | Frequency information |
| >UE security capability | UE security capability information |
| >K*gNB | Target base key |
| >PDU session to be setup List | PDU session setup list |
| >>PDU session ID | PDU session identifier |
| >>UP integrity indication | Indication indicating whether user plane integrity protection is enabled |

Alternatively, the first base station provides an indication indicating whether user plane integrity protection at a DRB granularity is enabled, for example:

| | |
|---|---|
| >Target Cell ID | Target cell identifier |
| > carrier Freq | Frequency information |
| >UE security capability | UE security capability information |
| >K*gNB | Target base key |
| >PDU session to be setup List | PDU session setup list |
| >>PDU session ID | PDU session identifier |
| >>>DRB list | |
| >>>>DRB ID | |
| >> >>UP integrity indication | Indication indicating whether user plane integrity protection is enabled |

Alternatively, the first base station provides an indication indicating whether user plane integrity protection at a QoS flow granularity is enabled, for example:

| | |
|---|---|
| >Target Cell ID | Target cell identifier |
| > carrier Freq | Frequency information |
| >UE security capability | UE security capability information |
| >K*gNB | Target base key |
| >PDU session to be setup List | PDU session setup list |
| >>PDU session ID | PDU session identifier |
| >>>QoS flow list | |
| >>>>QoS flow ID | |
| >>>>UP integrity indication | Indication indicating whether user plane integrity protection is enabled |

All the above parameters exist or do not exist based on actual conditions.

S105. The second base station derives, based on the target base key and the at least one PDU session identifier, a user plane key corresponding to the PDU session identifier.

Specifically, after receiving the UE security capability information sent by the first base station, the second base station selects a security algorithm (which may further include a control plane security algorithm and a user plane security algorithm, a control plane encryption algorithm, a control plane integrity protection algorithm, a user plane encryption algorithm, a user plane integrity protection algorithm, or the like) based on the UE security capability information and a security capability of the second base station. After receiving the foregoing other information, the second base station derives, based on the target base key and the at least one PDU session identifier, the user plane key corresponding to the PDU session identifier. Deriving, based on the target base key and the at least one PDU session identifier, the user plane key corresponding to the PDU session identifier is specifically as follows: For example, there are five PDU session identifiers in total, a user plane key 1 is derived based on the target base key and a PDU session identifier 1, a user plane key 2 is derived based on the target base key and a PDU session identifier 2, . . . , and a user plane key 5 is derived based on the target base key and a PDU session identifier 5. The second base station sends the selected security algorithm and other information (for example, a cell radio network temporary identifier (Cell Radio Network Temporary Identifier, C-RNTI) used by the UE in a target cell) to the second base station through an Xn interface (an interface between the first base station and the second base station).

After the handover, to enable security authentication between the UE side and the second base station, further, the method may further include the following steps:

S106. The first base station sends a target security algorithm to the UE, where the target security algorithm is selected by the second base station for the UE based on the UE security capability information sent by the first base station, and sent by the second base station to the first base station.

S107. The first base station sends a third parameter and at least one PDU session identifier to the UE.

The third parameter includes at least one of an NCC, a target cell identifier, and frequency information. In addition, an indication indicating whether user plane integrity protection is enabled may be further included. Similarly, the indication indicating whether user plane integrity protection is enabled may be at a PDU session granularity, a DRB granularity, or a QoS flow granularity. If the target security algorithm is at a UE level, the information sent to the UE in S105 and S106 may include, for example, information in the following form in the RRC message:

| | |
|---|---|
| >Target Cell ID | Target cell identifier |
| >carrier Freq | Frequency information |
| >NCC (used to generate the target base key K*gNB) | |
| >Target security algorithm | |
| >>Encryption algorithm (may further be distinguished for a control plane and a user plane) | |
| >>Integrity protection algorithm (may further be distinguished for a control plane and a user plane) | |
| >>Key derivation algorithm (probably does not exist) | |
| >PDU session list | PDU session list |
| >>PDU session ID | PDU session identifier |
| >>UP integrity indication | Indication indicating whether user plane integrity protection is enabled |

All the above parameters exist or do not exist based on actual conditions.

If the target security algorithm is at a PDU session granularity, the information sent to the UE in S105 and S106 may include, for example, information in the following form in the RRC message:

| | |
|---|---|
| >Target Cell ID | Target cell identifier |
| >carrier Freq | Frequency information |
| >NCC (used to generate the target base key K*gNB) | |
| >PDU session list | PDU session list |
| >>PDU session ID | PDU session identifier |

-continued

| | |
|---|---|
| >>UP integrity indication | Indication indicating whether user plane integrity protection is enabled |
| >>Target security algorithm | |
| >>>Encryption algorithm (may further be distinguished for a control plane and a user plane) | |
| >>>Integrity protection algorithm (may further be distinguished for a control plane and a user plane) | |
| >>>Key derivation algorithm (probably does not exist) | |

The indications indicating whether user plane integrity protection is enabled in the foregoing examples are at a PDU session granularity. The foregoing indications may alternatively be at a DRB granularity or a QoS flow granularity. Details are not described herein. All the above parameters exist or do not exist based on actual conditions.

S108. The UE derives the target base key based on a base key of the UE and the third parameter, derives, based on the target base key and the at least one PDU session identifier, a user plane key corresponding to the PDU session identifier, and then performs security processing on user plane data in the PDU session by using the user plane key corresponding to the PDU session identifier and the target security algorithm.

In this embodiment, when the first base station is a master base station, and the second base station is a secondary base station, key derivation and exchange in a DC scenario are implemented. In this case, the third parameter includes a secondary cell group SCG counter, and a same process S103 to S107 is performed.

In this embodiment, the first base station derives the target base key based on the base key and the third parameter, and sends the derived target base key and the at least one PDU session identifier to the second base station. The second base station derives, based on the target base key and the at least one PDU session identifier, the user plane key corresponding to the PDU session identifier. The second base station selects the target security algorithm for the UE based on the UE security capability information sent by the first base station. Therefore, the second base station performs security processing on the user plane data in the PDU session by using the user plane key corresponding to the PDU session identifier and the target security algorithm. The first base station further sends the third parameter and the at least one PDU session identifier to the UE. The UE derives the target base key based on the base key of the UE and the third parameter, derives, based on the target base key and the at least one PDU session identifier, the user plane key corresponding to the PDU session identifier, and performs security processing on the user plane data in the PDU session by using the user plane key corresponding to the PDU session identifier and the target security algorithm. When the third parameter includes at least one of the NCC, the target cell identifier, and the frequency information, key derivation and exchange in a process in which the source base station is handed over to the target handover base station are implemented. When the third parameter includes the secondary cell group SCG counter, key derivation and exchange in the DC scenario are implemented.

Figure 8:
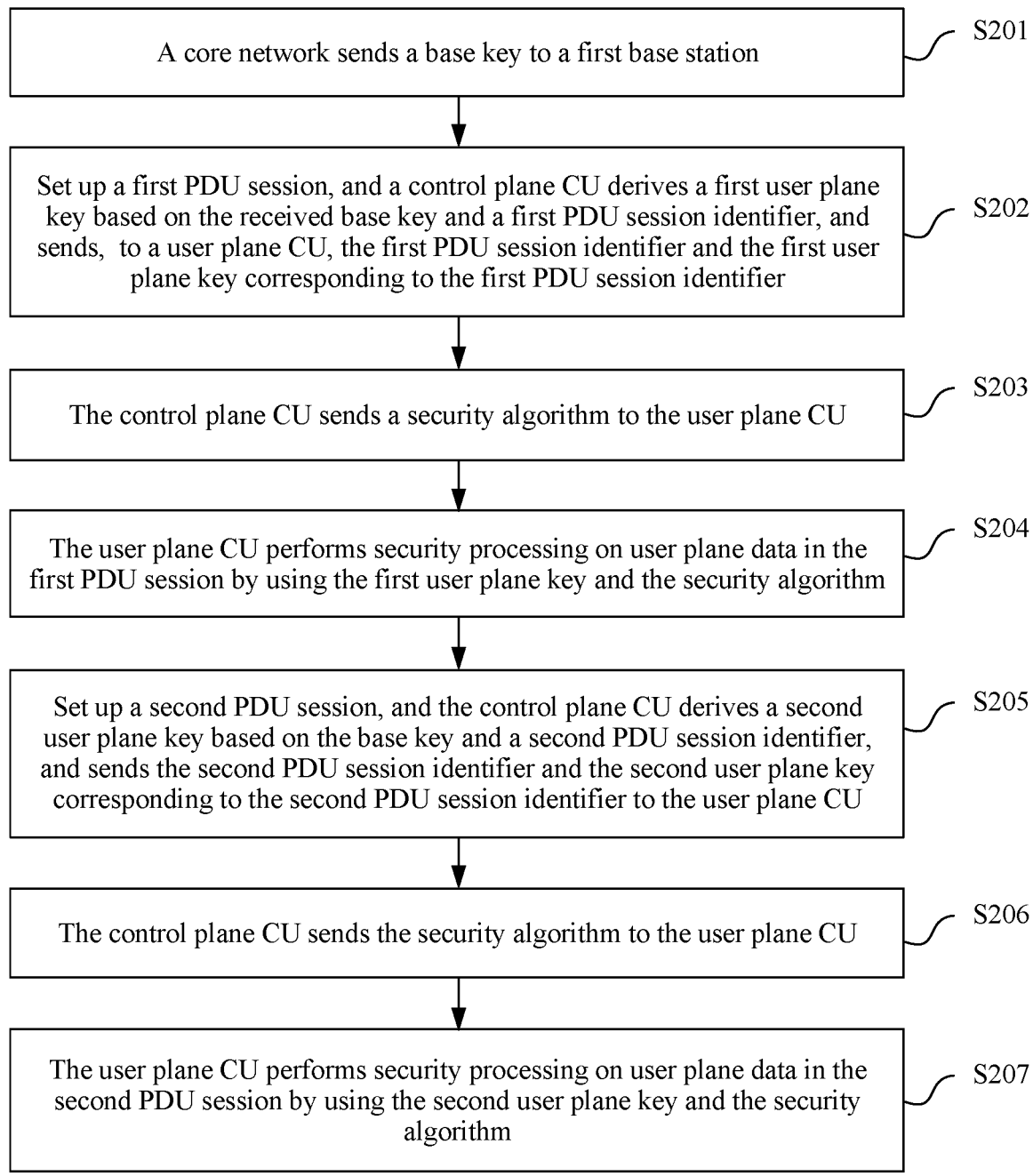
FIG. 8 is a flowchart of an embodiment of a data security processing method according to this application.

FIG. 8 is a flowchart of an embodiment of a data security processing method according to this application. As shown in FIG. 8, in this embodiment, a first base station includes a CU and a DU, the CU includes a control plane CU and a user plane CU, and the control plane CU is connected to the user plane CU through a communications interface. In a CU-DU separation scenario, the method in this embodiment may include the following steps.

S201. A core network sends a base key to the first base station, and may further send UE security capability information.

Optionally, an indication indicating whether user plane integrity protection at a PDU session granularity or a QoS flow granularity is enabled may be further included. The indication may further be extended to an indication indicating whether control plane encryption, control plane integrity protection, user plane encryption, and user plane integrity protection are enabled. Specifically, the control plane CU receives the base key sent by the core network. Optionally, the control plane CU receives the indication that is sent by the core network and that indicates whether user plane integrity protection at a PDU session granularity or a QoS flow granularity is enabled.

S202. Set up a first PDU session, and the control plane CU derives a first user plane key based on the received base key and a first PDU session identifier, and sends, to the user plane CU, the first PDU session identifier and the first user plane key corresponding to the first PDU session identifier.

A key derivation algorithm for deriving the first user plane key may be specified in a protocol, or may be selected by the control plane CU based on a UE security capability and a security capability of the control plane CU. If the control plane CU selects the key derivation algorithm based on the UE security capability and the security capability of the control plane CU, the key derivation algorithm may be at a UE granularity, or may be at a PDU session granularity. Optionally, the key derivation algorithm may alternatively be obtained as follows: The user plane CU sends a security capability of the user plane CU to the control plane CU, and the control plane CU selects the key derivation algorithm based on the UE security capability and the user plane security capability.

Specifically, the control plane CU may send, to the user plane CU through an E1 interface, the first PDU session identifier and the first user plane key corresponding to the first PDU session identifier. For example, the control plane CU includes, by using a UE context connection setup request (UE context setup request) or PDU session setup request (session setup request) message, the first PDU session identifier and the first user plane key corresponding to the first PDU session identifier. If the first PDU session identifier and the first user plane key corresponding to the first PDU session identifier are sent by using a UE-level message (for example, the UE context setup request), information in the following form may be included:

>CU-CP E1APUE ID    E1 interface identifier of the UE on a CU-CP side
    >PDU session list
    >>PDU session ID
    >>KUPenc
    >>KUPint All the above parameters exist or do not exist based on actual conditions. In particular, the control plane CU determines, according to the user plane integrity protection indication sent by the core network, whether to derive the user plane integrity protection key KUPint. If the core network indicates that user plane integrity protection is disabled, the control plane CU does not provide the user plane integrity protection key to the user plane CU. Similarly, if the user plane encryption indication provided by the core network indicates that user plane encryption is disabled, the control plane CU does not provide the user plane encryption key KUPenc to the user plane CU.

When the core network provides an indication indicating whether user plane integrity protection at a QoS flow granularity is enabled, a message sent by the control plane CU to the user plane CU may include the following content:

>CU-CP E1APUE ID    E1 interface identifier of the UE on a CU-CP side
    >PDU session list
    >>PDU session ID
    >>KUPenc
    >>QoS flow list
    >>>QoS flow ID
    >>>KUPint If the first PDU session identifier and the first user plane key corresponding to the first PDU session identifier are sent by using a PDU session-level message (for example, the PDU session setup request), information in the following form may be included:

>CU-CP E1APUEID    E1 interface identifier of the UE on a CU-CP side
    >PDU session ID
    >KUPenc
    >KUPint All the above parameters exist or do not exist based on actual conditions. Whether the control plane CU provides the user plane integrity protection key KUPint and the user plane encryption key KUPenc is the same as that in the foregoing operation.

When the core network provides an indication indicating whether user plane integrity protection at a QoS flow granularity is enabled, a message sent by the control plane CU to the user plane CU may include the following content:

>CU-CP E1APUEID    E1 interface identifier of the UE on a CU-CP side
    >PDU session ID
    >KUPenc
    >QoS flow list
    >>QoS flow ID
    >>KUPint S203. The control plane CU sends a security algorithm to the user plane CU.

The security algorithm is selected by the control plane CU for the UE based on the UE security capability information and a security capability of the first base station. Alternatively, the user plane CU sends in advance a security algorithm supported by the user plane CU to the control plane CU, and the control plane CU selects a proper security algorithm based on the security algorithm supported by the user plane CU and a UE security algorithm capability. The security algorithm includes an encryption algorithm and an integrity protection algorithm. When the security algorithm includes a control plane security algorithm and a user plane security algorithm, the control plane CU herein sends the user plane security algorithm to the user plane CU, where the user plane security algorithm includes a user plane encryption algorithm and a user plane integrity protection algorithm.

S204. The user plane CU performs security processing on user plane data in the first PDU session by using the first user plane key and the security algorithm.

For example, when the indication indicating whether user plane integrity protection is enabled is at a PDU session granularity, if the control plane CU provides KUPenc and KUPint corresponding to the first PDU session, the user plane CU performs encryption and integrity protection processing on the user plane data corresponding to the first PDU session identifier. When the control plane CU provides only KUPenc corresponding to the first PDU session, the user plane CU performs encryption processing only on the user plane data corresponding to the first PDU session. When the indication indicating whether user plane integrity protection is enabled is at a QoS flow granularity, if the control plane CU provides KUPenc and KUPint corresponding to the first PDU session, the user plane CU performs encryption processing on the user plane data corresponding to the first PDU session identifier. Then, the user plane CU determines, according to the indication indicating whether user plane integrity protection corresponding to the QoS flow identifier is enabled, whether to perform integrity protection processing on user plane data corresponding to the QoS flow identifier.

S205. Set up a second PDU session, and the control plane CU derives a second user plane key based on the base key and a second PDU session identifier, and sends the second PDU session identifier and the second user plane key corresponding to the second PDU session identifier to the user plane CU.

S206. The control plane CU sends the security algorithm to the user plane CU.

When the security algorithm is at a UE level, the control plane CU sends the security algorithm to the user plane CU when a PDU session is set up for the first time. When the security algorithm is at a PDU session level, that is, when security algorithms of PDU sessions are different, S206 needs to be performed each time a PDU session is set up.

S207. The user plane CU performs security processing on user plane data in the second PDU session by using the second user plane key and the security algorithm.

The user plane key includes a user plane encryption key and/or a user plane integrity protection key.

In this embodiment, the control plane CU receives the base key sent by the core network, derives the user plane key based on the base key and a PDU session identifier of each PDU session, and sends the PDU session identifier and the user plane key corresponding to the PDU session identifier to the user plane CU. The user plane CU performs security processing on user plane data in the PDU session by using the user plane key corresponding to the PDU session identifier and the security algorithm, thereby improving data transmission security in a CP-UP separation scenario.

Figure 9:
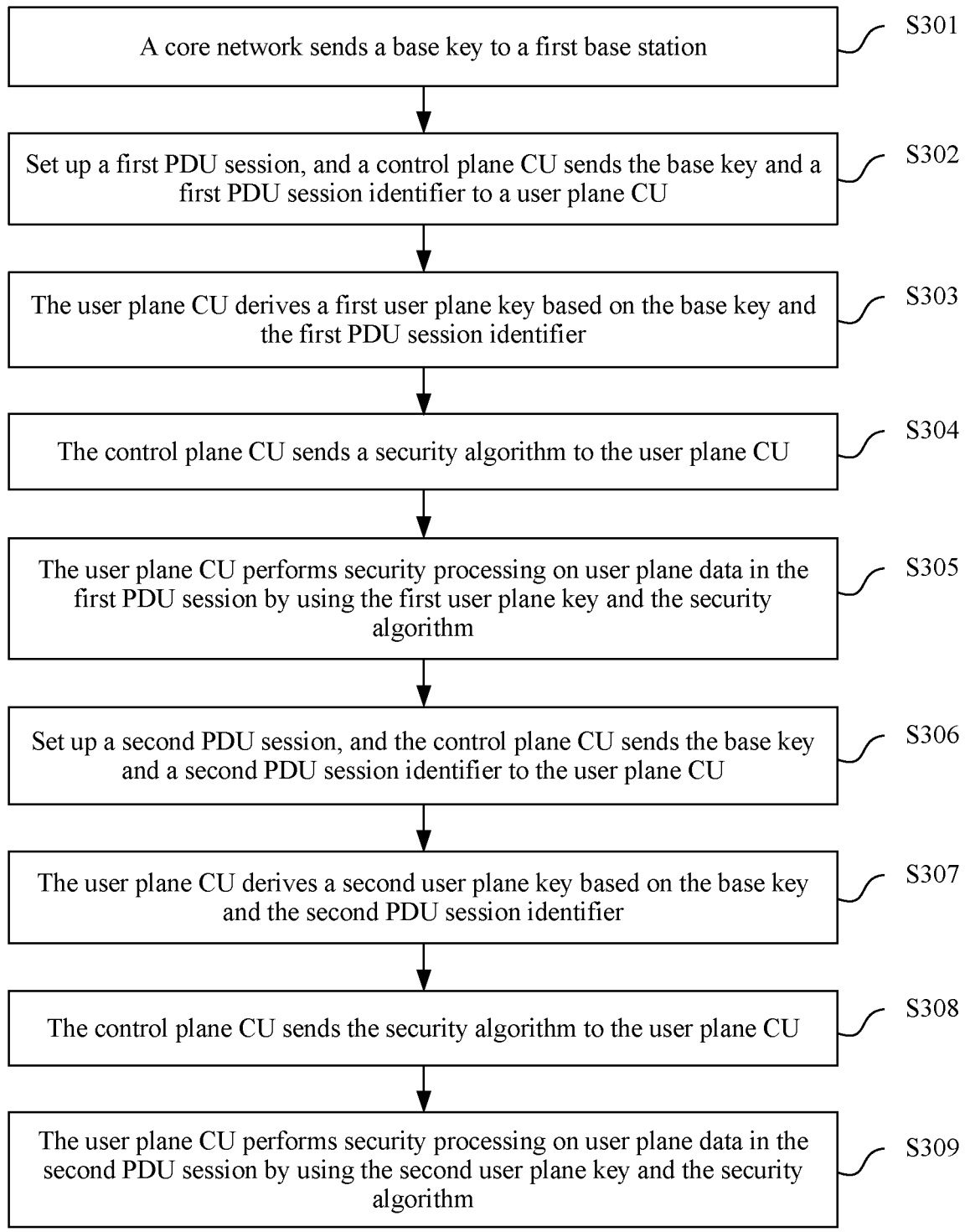
FIG. 9 is a flowchart of an embodiment of another data security processing method according to this application.

FIG. 9 is a flowchart of an embodiment of another data security processing method according to this application. As shown in FIG. 9, in this embodiment, a first base station includes a CU and a DU, the CU includes a control plane CU and a user plane CU, and the control plane CU is connected to the user plane CU through a communications interface. In a CU-DU separation scenario, the method in this embodiment may include the following steps.

S301. A core network sends a base key to the first base station, and may further send UE security capability information.

Optionally, an indication indicating whether user plane integrity protection at a PDU granularity or a QoS flow granularity is enabled may be further included, and the indication may further be extended to an indication indicating whether control plane encryption, control plane integrity protection, user plane encryption, and user plane integrity protection are enabled. Specifically, the control plane CU receives the base key sent by the core network.

S302. Set up a first PDU session, and the control plane CU sends the base key and a first PDU session identifier to the user plane CU.

S303. The user plane CU derives a first user plane key based on the base key and the first PDU session identifier.

In particular, the control plane CU sends, to the user plane CU, an indication that is sent by the core network and that indicates whether user plane integrity protection corresponding to the first PDU session identifier is enabled, and certainly an indication indicating whether user plane encryption corresponding to the first PDU session identifier is enabled may be further included. The user plane CU determines, according to the indication, whether to derive a user plane integrity protection key and a user plane encryption key. When the control plane CU does not provide the indication, the user plane CU needs to derive a corresponding user plane key by default. Alternatively, the control plane CU sends, to the user plane CU, an indication that is sent by the core network and that indicates whether user plane integrity protection corresponding to each QoS flow identifier in the first PDU session identifier is enabled, and the user plane CU decides, according to the indication, whether to derive a user plane integrity protection key corresponding to the first PDU session and whether to perform integrity protection processing on user plane data corresponding to a QoS flow. For example, once user plane integrity protection corresponding to one QoS flow identifier in the first PDU session is indicated to be enabled, the user plane CU derives the user plane integrity protection key corresponding to the first PDU session, and performs integrity protection processing on user plane data corresponding to the QoS flow for which user plane integrity protection is indicated to be enabled.

S304. The control plane CU sends a security algorithm to the user plane CU.

The security algorithm is selected by the control plane CU for the UE based on the UE security capability information and a security capability of the first base station. Alternatively, the user plane CU sends in advance a user plane security algorithm supported by the user plane CU to the control plane CU, and the control plane CU selects a proper security algorithm based on the user plane security algorithm supported by the user plane CU and a UE security algorithm capability. The security algorithm includes an encryption algorithm and an integrity protection algorithm. When the security algorithm includes a control plane security algorithm and a user plane security algorithm, the control plane CU herein sends the user plane security algorithm to the user plane CU, where the user plane security algorithm includes a user plane encryption algorithm and a user plane integrity protection algorithm.

S305. The user plane CU performs security processing on user plane data in the first PDU session by using the first user plane key and the security algorithm.

S306. Set up a second PDU session, and the control plane CU sends the base key and a second PDU session identifier to the user plane CU.

S307. The user plane CU derives a second user plane key based on the base key and the second PDU session identifier.

S308. The control plane CU sends the security algorithm to the user plane CU.

When the security algorithm is at a UE level, the control plane CU sends the security algorithm to the user plane CU when a PDU session is set up for the first time. When the security algorithm is at a PDU session level, that is, when security algorithms of PDU sessions are different, S206 needs to be performed each time a PDU session is set up.

S309. The user plane CU performs security processing on user plane data in the second PDU session by using the second user plane key and the security algorithm.

In this embodiment, the control plane CU receives the base key sent by the core network, and sends the base key and a PDU session identifier of each PDU session to the user plane CU. The user plane CU derives a user plane key based on the base key and the PDU session identifier of each PDU session, and performs security processing on user plane data in the PDU session by using the user plane key corresponding to the PDU session identifier and the security algorithm, thereby improving data transmission security in a CP-UP separation scenario.

Figure 10:
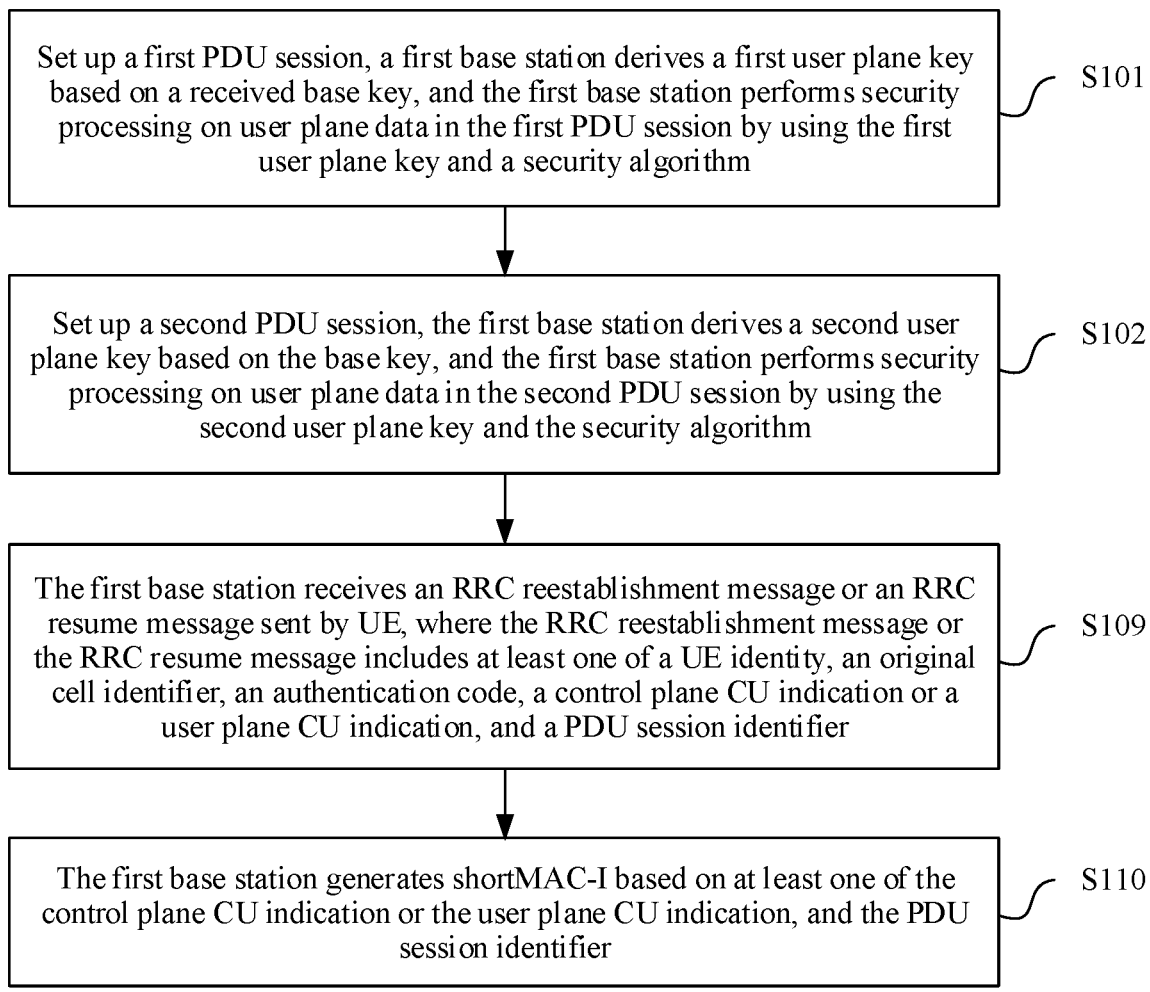
FIG. 10 is a flowchart of an embodiment of another data security processing method according to this application.

FIG. 10 is a flowchart of an embodiment of another data security processing method according to this application. As shown in FIG. 10, in this embodiment, on a basis of the method shown in FIG. 6, in an RRC reestablishment scenario, after a radio link failure occurs on UE, an RRC reestablishment procedure is initiated. The method in this embodiment may further include the following steps.

S108. The first base station receives an RRC reestablishment message or an RRC resume message sent by the UE, where the RRC reestablishment message or the RRC resume message includes at least one of a UE identity, an original cell identifier, an authentication code (shortMAC-I), a control plane CU indication or a user plane CU indication, and a PDU session identifier.

The UE identity may be an air interface identifier such as a C-RNTI or a resume identifier (A-RNTI).

S109. The first base station generates shortMAC-I based on at least one of the UE identity, the original cell identifier, the control plane CU indication or the user plane CU indication, and the PDU session identifier, and determines, by comparing the generated shortMAC-I with the shortMAC-I sent by the UE, whether authentication succeeds.

Specifically, there may be the following several implementations:

Select a corresponding control plane integrity protection key or user plane integrity protection key according to the control plane indication or the user plane CU indication to generate the shortMAC-I. For example, the base station generates the shortMAC-I based on the UE identity, the original cell identifier, an identity of a currently accessed cell, and the control plane integrity protection key or the user plane integrity protection key. When there are a plurality of user plane integrity protection keys, for example, each PDU session has a corresponding user plane integrity protection key, the user plane integrity protection key may be selected as specified in a protocol, for example, a user plane integrity protection key with a minimum PDU session identifier.

Select, based on the PDU session identifier, a user plane integrity protection key corresponding to the PDU session identifier to generate the shortMAC-I. For example, the base station generates the shortMAC-I based on the UE identity, the original cell identifier, the identity of the currently accessed cell, and the user plane integrity protection key corresponding to the PDU session identifier.

In this embodiment, the first base station receives the RRC reestablishment message or the RRC resume message sent by the UE, and the first base station generates the shortMAC-I based on at least one of the UE identity, the original cell identifier, the control plane CU indication or the user plane CU indication, and the PDU session identifier, so as to verify validity of the UE by using shortMAC-I, thereby implementing data transmission security in an RRC reestablishment or RRC resume scenario.

In this embodiment of this application, to implement key generation and exchange at a DRB granularity, the foregoing method provided in the embodiments shown in FIG. 6 to FIG. 10 may be used. A difference lies in that the PDU session identifier in the embodiments shown in FIG. 6 to FIG. 10 is changed to a DRB identifier, and the first base station derives a user plane key at a DRB granularity.

Figure 11:
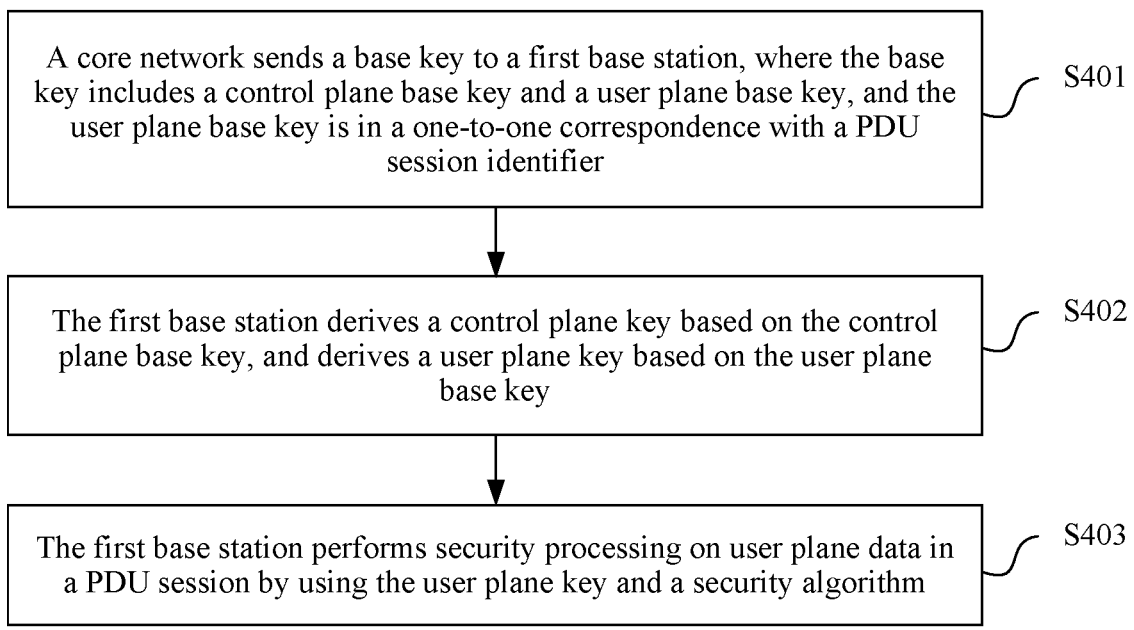
FIG. 11 is a flowchart of an embodiment of another data security processing method according to this application.

FIG. 11 is a flowchart of an embodiment of another data security processing method according to this application. As shown in FIG. 11, the method in this embodiment may include the following steps.

S401. A core network sends a base key to a first base station, where the base key includes a control plane base key and a user plane base key, and the user plane base key is in a one-to-one correspondence with a PDU session identifier.

The control plane base key (CP KgNB) may be provided by the core network when a PDU session is set up for the user for the first time, and the user plane base key (UP KgNB) may be provided each time a PDU session is set up. The core network sends the base key to the first base station, and may further send UE security capability information and an indication indicating whether user plane integrity protection is enabled. The indication may further be extended to an indication indicating whether control plane encryption, control plane integrity protection, user plane encryption, and user plane integrity protection are enabled. In addition, the indication indicating whether user plane integrity protection is enabled and the indication indicating whether user plane encryption is enabled may be at a PDU session granularity or at a QoS flow granularity. For example, an AMF network element of the core network provides both the CP KgNB and UP KgNB1, the UE security capability information, and the like in an initial context setup request (Initial Context setup request) of an Ng interface. For example, a message in the following form is included:

| | |
|---|---|
| >AMF NGAPUEID | NG interface identifier of the UE on an |
| AMF side | |
| >UE security capability | UE security capability information |
| >CP KgNB | |
| >PDU session ID | PDU session identifier |
| >UP KgNB1 | |
| >UP integrity indication | Indication indicating whether user plane |
| integrity protection is enabled | |

All the above parameters exist or do not exist based on actual conditions.

When user plane integrity protection is at a QoS flow granularity, the initial context setup request message includes a message in the following form:

| | |
|---|---|
| >AMF NGAPUEID | NG interface identifier of the UE on an |
| AMF side | |
| >UE security capability | UE security capability information |
| >CP KgNB | |
| >PDU session ID | PDU session identifier |
| >UP KgNB1 | |
| >>QoS flow list | |
| >>>QoS flow ID | |
| >>>UP integrity indication | Indication indicating whether user plane |
| integrity protection is enabled | |

All the above parameters exist or do not exist based on actual conditions.

During subsequent PDU session setting up, for example, in a PDU session setup request message, only UP KgNB2 (UP KgNB3 and the like), and the UE security capability information (probably not provided because the UE security capability information is provided for the first time) may be provided. The foregoing messages are all examples, and this application is not limited thereto. For example, a message in the following form is included:

| | |
|---|---|
| >AMF NGAPUEID | NG interface identifier of the UE on an |
| AMF side | |
| >PDU session ID | |
| >UP KgNB2 | |
| >UP integrity indication | Indication indicating whether user plane |
| integrity protection is enabled | |

All the above parameters exist or do not exist based on actual conditions. In addition, the indication indicating whether user plane integrity protection is enabled may alternatively be at a QoS flow granularity, and details are not described herein.

S402. The first base station derives a control plane key based on the control plane base key, and derives a user plane key based on the user plane base key.

The user plane base key is at a PDU session granularity, and each time a PDU session is set up, the user plane base key is sent. It should be noted that a key derivation algorithm for deriving the user plane key by the first base station based on the user plane base key may be specified in a protocol and does not need to be negotiated. Alternatively, the key derivation algorithm may be obtained through negotiation. For example, the UE adds, to the UE security capability information, a key derivation algorithm (which may be extended to a control plane key derivation algorithm and a user plane key derivation algorithm) supported by the UE. Then, the first base station may finally select a proper key derivation algorithm based on the key derivation algorithm supported by the UE and a key derivation algorithm supported by the first base station.

S403. The first base station performs security processing on user plane data in the PDU session by using the user plane key and a security algorithm.

Specifically, the first base station selects a proper security algorithm based on the UE security capability information and a security algorithm supported by the first base station. The security algorithm includes an encryption algorithm and an integrity protection algorithm. Further, the security algorithm may further include a control plane security algorithm and a user plane security algorithm. The control plane security algorithm includes a control plane encryption algorithm and a control plane integrity protection algorithm, and the user plane security algorithm includes a user plane encryption algorithm and a user plane integrity protection algorithm. Then, the first base station performs security processing on the user plane data in the PDU session by using the user plane key and the security algorithm or the user plane security algorithm. On the UE side, the first base station sends the selected security algorithm or control plane security algorithm and the user plane security algorithm to the UE, and may further send an indication indicating whether user plane integrity protection is enabled. For example, the UE is notified by the first base station by using an SMC message or an RRC reconfiguration message. The UE derives, based on the base key, the user plane key by using the key derivation algorithm or the user plane key derivation algorithm (specified in the protocol or provided by the first base station). Finally, the UE performs security processing on the user plane data in the PDU session by using the user plane key and the security algorithm or the user plane security algorithm. In particular, the first base station decides, according to an indication that is sent by the core network and that indicates whether user plane integrity protection at a PDU session granularity or a QoS flow granularity is enabled, whether to perform user plane integrity protection processing on user plane data corresponding to a PDU session identifier or a QoS flow identifier. Optionally, the first base station further sends, to the UE, the indication indicating whether user plane integrity protection at a PDU session granularity or a QoS flow granularity is enabled, so that the UE decides whether to perform user plane integrity protection processing on the user plane data corresponding to the PDU session identifier or the QoS flow identifier. The indication may further be extended to an indication indicating whether control plane encryption, control plane integrity protection, user plane encryption, and user plane integrity protection are enabled.

According to the data security processing method provided in this embodiment, each time a PDU session is set up, the first base station receives the user plane base key, derives a user plane key based on the user plane base key, and performs security processing on user plane data in the PDU session by using the derived user plane key and the security algorithm. Different PDU sessions use different user plane keys, thereby improving data transmission security.

Figure 12A:
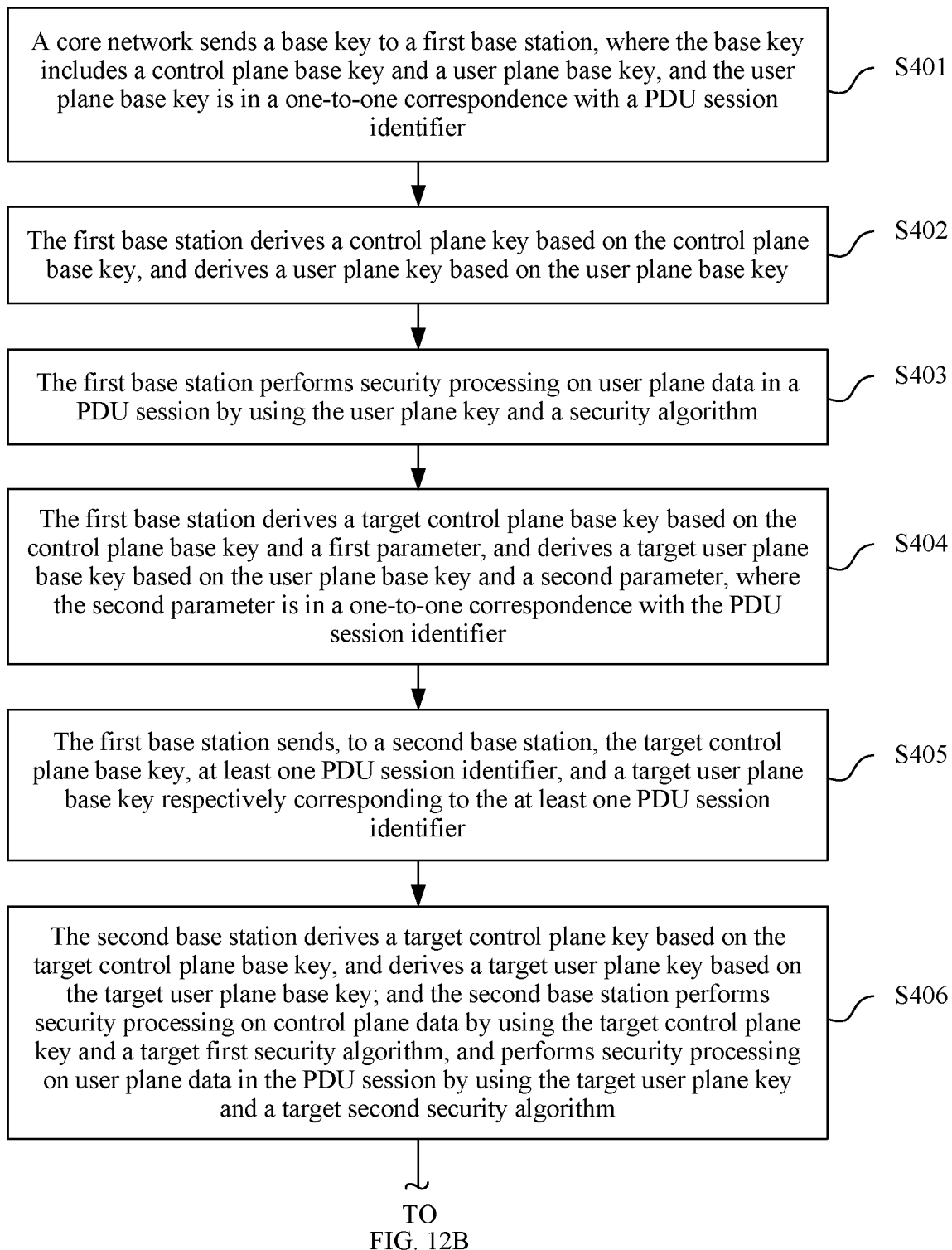
FIG. 12A and FIG. 12B are a flowchart of an embodiment of another data security processing method according to this application.
Figure 12B:
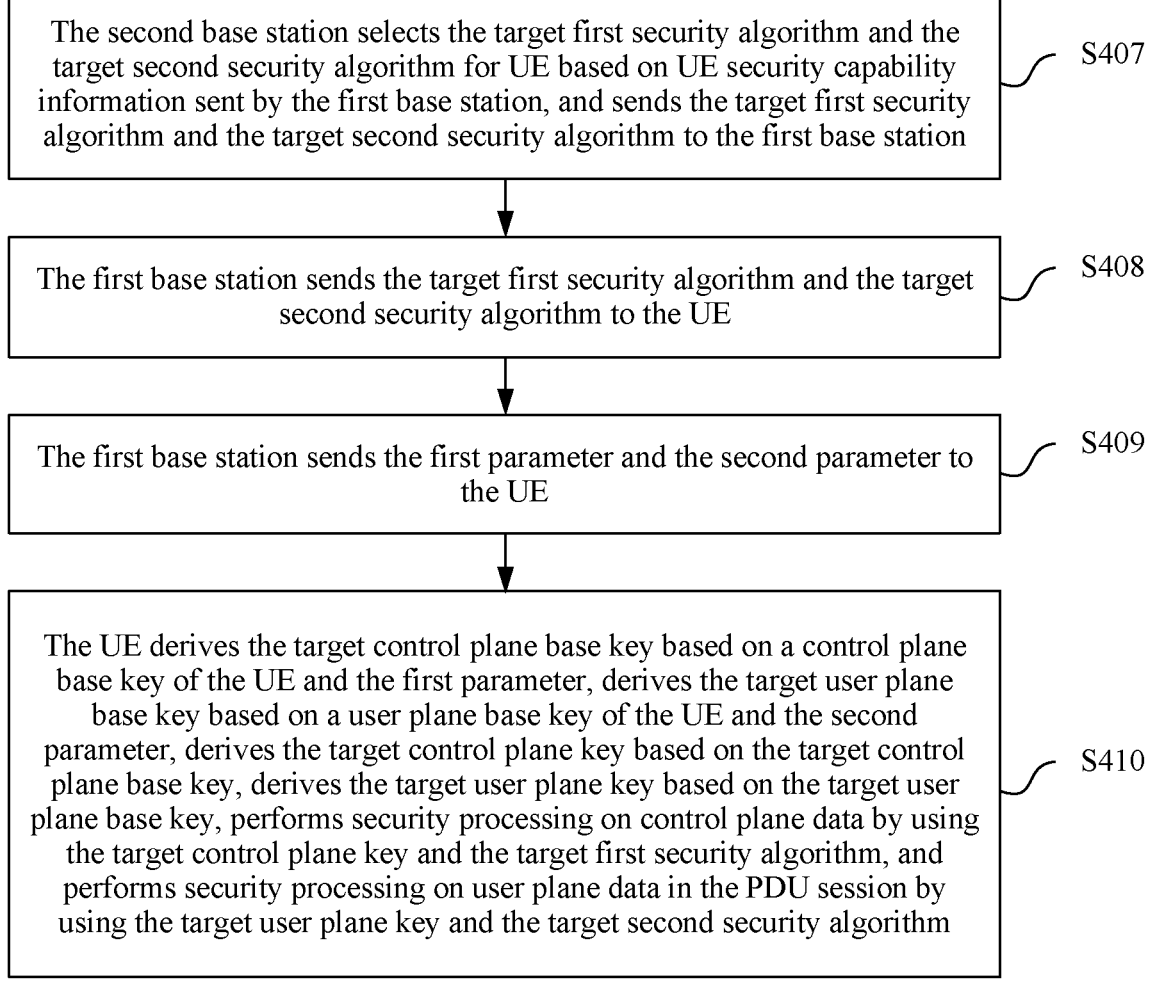

Further, after the PDU session is set up between the first base station and the UE, the UE may be handed over from a source base station to a target handover base station. In this case, how to derive the user plane key is described below. FIG. 12A and FIG. 12B are a flowchart of an embodiment of another data security processing method according to this application. As shown in FIG. 12A and FIG. 12B, the method in this embodiment may further include the following steps based on the method shown in FIG. 11.

S404. The first base station derives a target control plane base key based on the control plane base key and a first parameter, and derives a target user plane base key based on the user plane base key and a second parameter, where the second parameter is in a one-to-one correspondence with the PDU session identifier.

The control plane base key is sent by the core network when the PDU session is set up for the first time, and the user plane base key is sent by the core network when a PDU session is set up. The first base station is a source base station, and a second base station is a target handover base station. The first parameter includes at least one of an NCC, a target cell identifier, and frequency information, and the second parameter includes at least one of an NCC, a target cell identifier, a PDU session identifier, and frequency information.

Specifically, the first base station derives the target user plane base key based on the user plane base key and the second parameter. For example, before the handover, four PDU sessions are set up, and are corresponding to four user plane base keys and four PDU session identifiers. The first base station derives a target user plane base key 1 based on at least one of a user plane base key 1, the NCC, a target cell identifier 1, a PDU session identifier 1, and frequency information 1. The first base station derives a target user plane base key 2 based on at least one of a user plane base key 2, the NCC, a target cell identifier 2, a PDU session identifier 2, and frequency information 2. By analogy, the first base station derives a target user plane base key 4 based on a user plane base key 4, the NCC, a target cell identifier 4, a PDU session identifier 4, and frequency information 4. Generally, the target cell identifiers 1, 2, 3, and 4 are the same.

S405. The first base station sends, to the second base station, the target control plane base key, at least one PDU session identifier, and a target user plane base key respectively corresponding to the at least one PDU session identifier.

Specifically, for example, before the handover, four PDU sessions are set up, and the first base station sends, to the second base station, the target control plane base key, four PDU session identifiers, and target user plane base keys respectively corresponding to the four PDU session identifiers.

Optionally, the method may further include the following: The first base station sends, to the second base station, an indication indicating whether user plane integrity protection corresponding to a PDU session identifier, or corresponding to a DRB identifier, or corresponding to a QoS flow identifier is enabled, so that the second base station determines, according to the indication, whether to derive a user plane integrity protection key corresponding to the PDU session identifier, or the DRB identifier, or the QoS flow identifier. The indication may further be extended to an indication indicating whether control plane encryption, control plane integrity protection, user plane encryption, and user plane integrity protection are enabled.

Optionally, the foregoing information may be included in a handover request (Handover request) message sent by the first base station to the second base station, for example, the handover request includes information in the following form:

| | |
|---|---|
| >Target Cell ID | Target cell identifier |
| > carrier Freq | Frequency information |
| >UE security capability | UE security capability information |
| >CP K*gNB | Target control plane base key |
| >PDU session to be setup List | PDU session setup list |
| >>PDU session ID | PDU session identifier |
| >>UP K*gNB | Target user plane base key |
| >>UP integrity indication integrity protection is enabled | Indication indicating whether user plane |

All the above parameters exist or do not exist based on actual conditions. The foregoing information provides only an example about whether user plane integrity protection at a PDU session granularity is enabled. For an example of a DRB granularity and a QoS flow granularity, details are not described herein.

S406. The second base station derives a target control plane key based on the target control plane base key, and derives a target user plane key based on the target user plane base key; and the second base station performs security processing on control plane data by using the target control plane key and a target first security algorithm, and performs security processing on user plane data in the PDU session by using the target user plane key and a target second security algorithm.

The target control plane key includes a control plane encryption key and/or a control plane integrity protection key, and the target user plane key includes a user plane encryption key and/or a user plane integrity protection key. The target first security algorithm is selected by the second base station based on a UE security capability sent by the first base station and a security capability of the second base station, and the target second security algorithm is selected by the second base station based on the UE security capability sent by the first base station and the security capability of the second base station.

In addition, the second base station further decides, according to the indication indicating whether user plane integrity protection at a PDU session granularity, a DRB granularity, or a QoS flow granularity is enabled, whether to perform integrity protection processing on user plane data corresponding to the PDU session identifier, the DRB identifier, or the QoS flow identifier.

After the handover, to enable security authentication between the UE side and the second base station, further, after S405, the method may further include the following steps:

S407. The second base station selects the target first security algorithm and the target second security algorithm for the UE based on the UE security capability information sent by the first base station, and sends the target first security algorithm and the target second security algorithm to the first base station. In particular, when the target first security algorithm is the same as the target second security algorithm, the first base station needs to send only a target security algorithm to the second base station.

S408. The first base station sends the target first security algorithm and the target second security algorithm to the UE.

S409. The first base station sends the first parameter and the second parameter to the UE.

The first parameter includes at least one of the NCC, the target cell identifier, and the frequency information, and the second parameter includes at least one of the NCC, the PDU session identifier, the target cell identifier, and the frequency information.

If the first security algorithm or the second security algorithm is at a UE level, the information sent to the UE in S408 and S409 may include, for example, information in the following form in an RRC message:

| | |
|---|---|
| >Target Cell ID | Target cell identifier |
| > carrier Freq | Frequency information |
| >NCC for CP (used to generate the target control plane base key) | |
| >First security algorithm | |
| >>Encryption algorithm (may further be distinguished for a control plane and a user plane) | |
| >>Integrity protection algorithm (may further be distinguished for a control plane and a user plane) | |
| >>Key derivation algorithm (probably does not exist) | |
| >Second security algorithm | |
| >>Encryption algorithm (may further be distinguished for a control plane and a user plane) | |
| >>Integrity protection algorithm (may further be distinguished for a control plane and a user plane) | |
| >>Key derivation algorithm (probably does not exist) | |
| >PDU session list | PDU session list |
| >>PDU session ID | PDU session identifier |
| >>NCC for UP (used to generate the target user plane base key) | |

All the above parameters exist or do not exist based on actual conditions. In particular, when the NCC for CP and the NCC for UP are the same values, only one NCC needs to be provided.

If the first security algorithm or the second security algorithm is at a PDU session granularity, the information sent to the UE in S408 and S409 may include, for example, information in the following form in the RRC message:

```
>Target Cell ID        Target cell identifier
> carrier Freq         Frequency information
>NCC for CP (used to generate the target control plane
base key)
    >PDU session list      PDU session list
    >>PDU session ID       PDU session identifier
    >>NCC for UP (used to generate the target user plane
base key)
        >First security algorithm
            >>Encryption algorithm (may further be distinguished for
a control plane and a user plane)
                >>Integrity protection algorithm (may further be distinguished
for a control plane and a user plane)
                >>Key derivation algorithm (probably does not exist)
            >Second security algorithm
                >>Encryption algorithm (may further be distinguished for a
control plane and a user plane)
                >>Integrity protection algorithm (may further be distinguished
for a control plane and a user plane)
                >>Key derivation algorithm (probably does not exist)
```

All the foregoing parameters exist or do not exist based on actual situations. Optionally, when the NCC for CP and the NCC for UP are the same values, only one NCC needs to be provided.

S410. The UE derives the target control plane base key based on a control plane base key of the UE and the first parameter, derives the target user plane base key based on a user plane base key of the UE and the second parameter, derives the target control plane key based on the target control plane base key, derives the target user plane key based on the target user plane base key, performs security processing on the control plane data by using the target control plane key and the target first security algorithm, and performs security processing on the user plane data in the PDU session by using the target user plane key and the target second security algorithm.

In this embodiment, the first base station sends, to the second base station, the target control plane base key, the at least one PDU session identifier, and the target user plane base key respectively corresponding to the at least one PDU session identifier. The second base station derives the target control plane key based on the target control plane base key, and derives the target user plane key based on the target user plane base key, so that the second base station performs security processing on the control plane data by using the target control plane key and the target first security algorithm, and performs security processing on the user plane data in the PDU session by using the target user plane key and the target second security algorithm, thereby implementing key derivation and exchange in a process in which the source base station is handed over to the target handover base station.

Figure 13A:
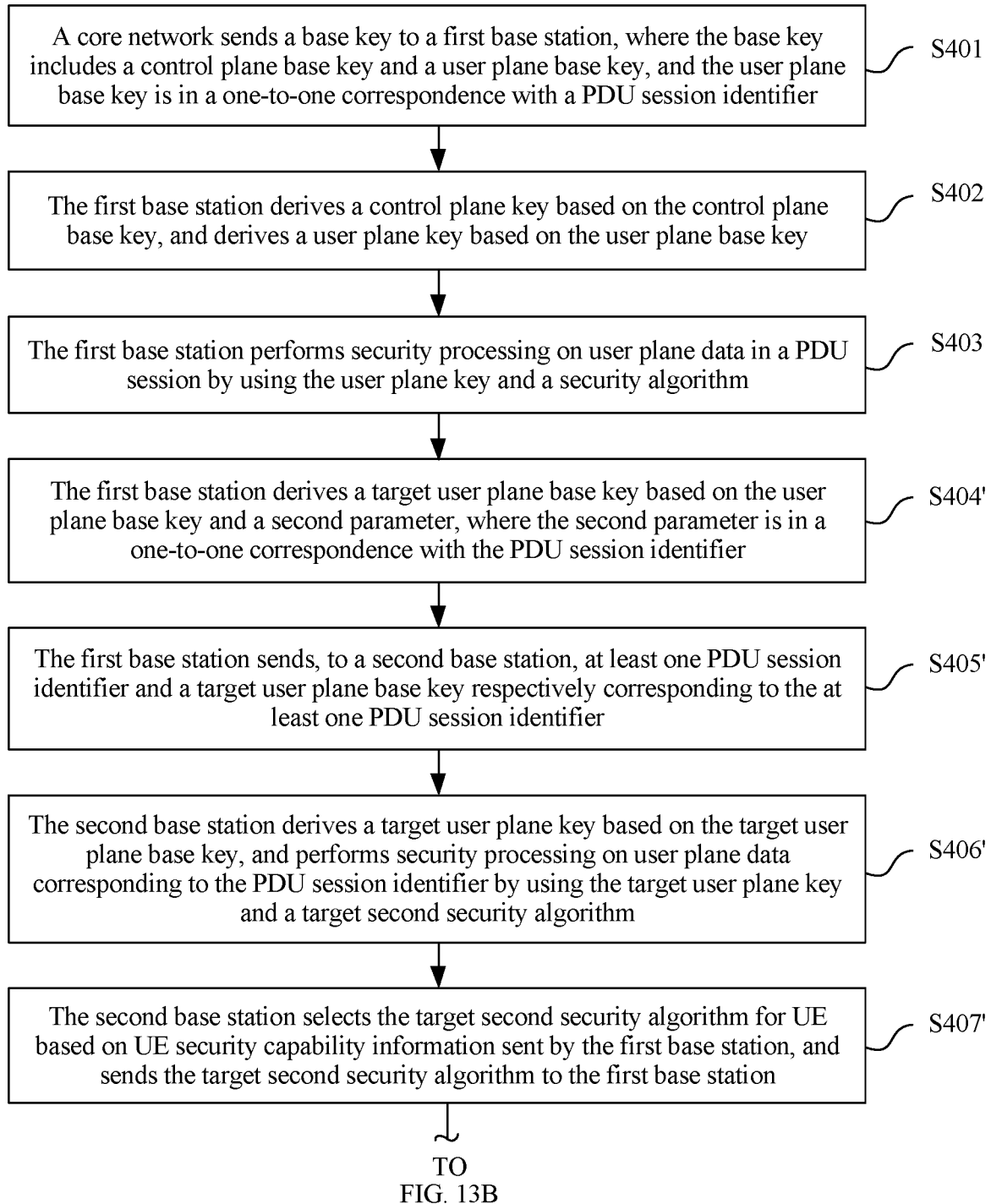
FIG. 13A and FIG. 13B are a flowchart of an embodiment of another data security processing method according to this application.
Figure 13B:
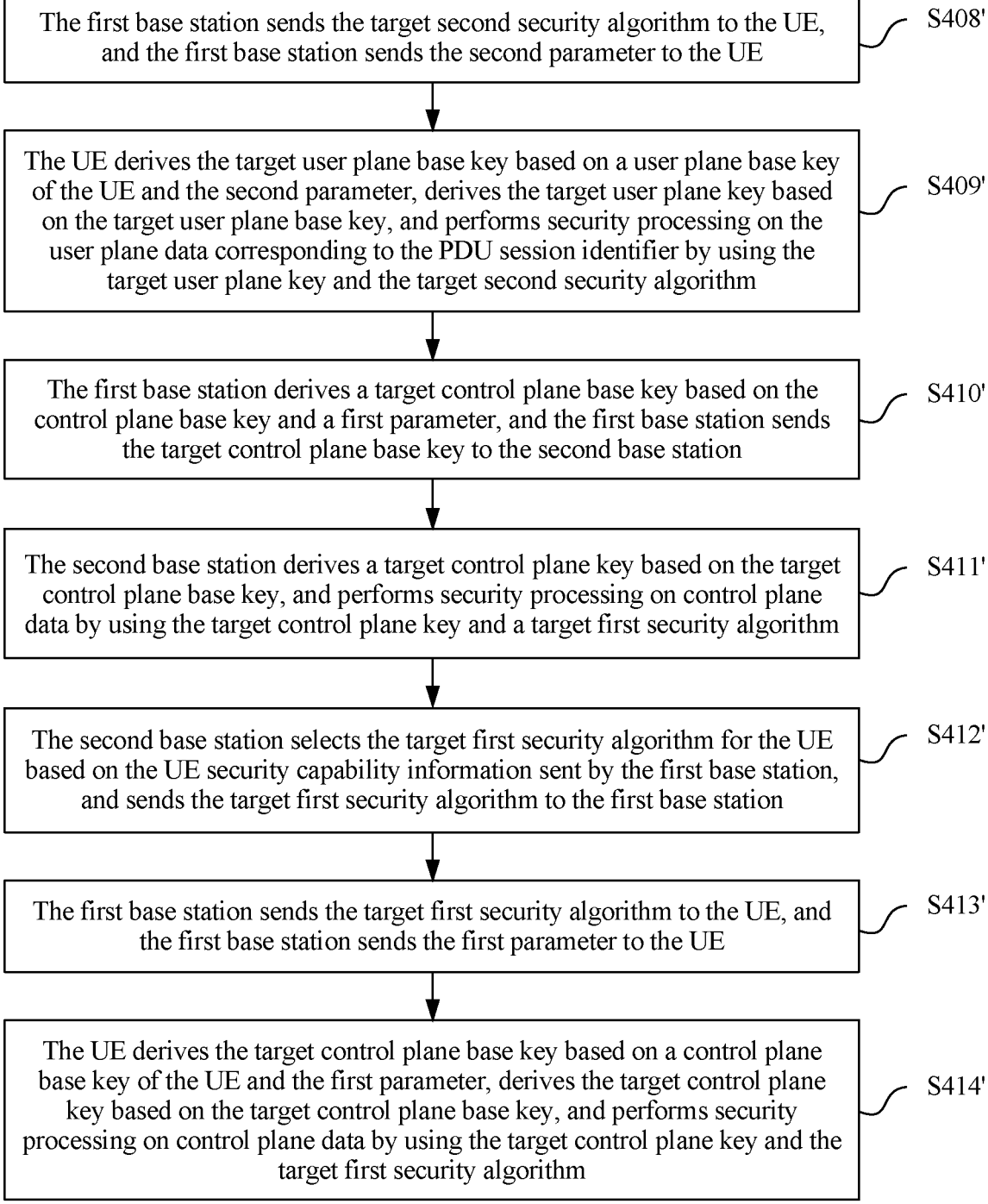

Further, after the PDU session is set up between the first base station and the UE, in a DC scenario, in this case, how to derive the user plane key is described below. FIG. 13A and FIG. 13B are a flowchart of an embodiment of another data security processing method according to this application. As shown in FIG. 13A and FIG. 13B, the method in this embodiment may further include the following steps based on the method shown in FIG. 11.

S404'. The first base station derives a target user plane base key based on the user plane base key and a second parameter, where the second parameter is in a one-to-one correspondence with the PDU session identifier, and the user plane base key is sent by the core network when the PDU session is set up.

S405'. The first base station sends, to a second base station, at least one PDU session identifier and a target user plane base key respectively corresponding to the at least one PDU session identifier.

The first base station is a master base station, the second base station is a secondary base station, and the second parameter includes at least one of an SCG counter or a PDU session identifier. In particular, the first base station further sends an indication indicating whether user plane integrity protection at a PDU session granularity, a DRB granularity, or a QoS flow granularity is enabled. The indication may further be extended to an indication indicating whether control plane encryption, control plane integrity protection, user plane encryption, and user plane integrity protection are enabled.

S406'. The second base station derives a target user plane key based on the target user plane base key, and performs security processing on user plane data corresponding to the PDU session identifier by using the target user plane key and a target second security algorithm.

The target second security algorithm is a target second security algorithm selected by the second base station for the UE based on the UE security capability information sent by the first base station.

The target user plane key includes a user plane encryption key and/or a user plane integrity protection key.

To enable the UE side to perform security authentication on the user plane data with the second base station, further, after S405', the method may further include the following steps:

S407'. The second base station selects the target second security algorithm for the UE based on the UE security capability information sent by the first base station, and sends the target second security algorithm to the first base station.

S408'. The first base station sends the target second security algorithm to the UE, and the first base station sends the second parameter to the UE.

S409'. The UE derives the target user plane base key based on a user plane base key of the UE and the second parameter, derives the target user plane key based on the target user plane base key, and performs security processing on the user plane data corresponding to the PDU session identifier by using the target user plane key and the target second security algorithm.

To enable the UE side to perform security authentication on control plane data with the second base station, further, after S405', the method may further include the following steps:

S410'. The first base station derives a target control plane base key based on the control plane base key and the first parameter, and the first base station sends the target control plane base key to the second base station.

The first parameter includes an SCG counter. For example, in an NR network, dual-connectivity DC may be extended as follows: The secondary base station may also send an RRC message. In this case, the secondary base station also needs to derive the control plane key based on the base key or the control plane base key.

S411'. The second base station derives a target control plane key based on the target control plane base key, and performs security processing on the control plane data by using the target control plane key and a target first security algorithm.

The target first security algorithm is a target first security algorithm selected by the second base station for the UE based on the UE security capability information sent by the first base station.

S412'. The second base station selects the target first security algorithm for the UE based on the UE security capability information sent by the first base station, and sends the target first security algorithm to the first base station.

S413'. The first base station sends the target first security algorithm to the UE, and the first base station sends the first parameter to the UE.

S414'. The UE derives the target control plane base key based on a control plane base key of the UE and the first parameter, derives the target control plane key based on the target control plane base key, and performs security processing on the control plane data by using the target control plane key and the target first security algorithm.

Further, the method further includes the following: The first base station sends, to the second base station, an indication indicating whether user plane integrity protection corresponding to the PDU session identifier is enabled; and the second base station determines, according to the indication, whether to derive a user plane integrity protection key corresponding to the PDU session identifier. The indication that is sent by the first base station and that indicates whether user plane integrity protection is enabled may be at a PDU session granularity, a DRB granularity, or a QoS flow granularity. The indication may further be extended to an indication indicating whether control plane encryption, control plane integrity protection, user plane encryption, and user plane integrity protection are enabled.

In this embodiment, the first base station sends, to the second base station, the at least one PDU session identifier and the target user plane base key respectively corresponding to the at least one PDU session identifier. The second base station derives the target user plane key based on the target user plane base key, so that the second base station performs security processing on the control plane data by using the target control plane key and the target first security algorithm, and performs security processing on the user plane data in the PDU session by using the target user plane key and the target second security algorithm, thereby implementing key derivation and exchange in a DC scenario.

Figure 14:
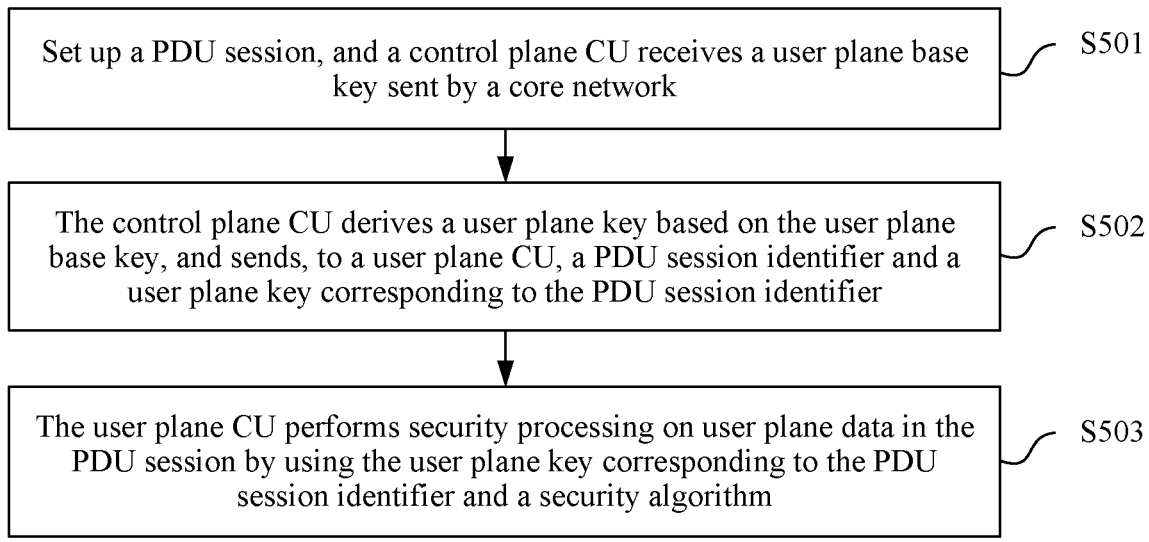
FIG. 14 is a flowchart of an embodiment of a data security processing method according to this application.

FIG. 14 is an interaction flowchart of an embodiment of a data security processing method according to this application. As shown in FIG. 14, in this embodiment, a base station includes a CU and a DU, the CU includes a control plane CU and a user plane CU, and the control plane CU is connected to the user plane CU through a communications interface. In a CU-DU separation scenario, the method in this embodiment may include the following steps.

S501. Set up a PDU session, and the control plane CU receives a user plane base key sent by a core network.

S502. The control plane CU derives a user plane key based on the user plane base key, and sends, to the user plane CU, a PDU session identifier and a user plane key corresponding to the PDU session identifier, where the user plane key includes a user plane encryption key and/or a user plane integrity protection key.

S503. The user plane CU performs security processing on user plane data in the PDU session by using the user plane key corresponding to the PDU session identifier and a security algorithm. The security algorithm includes an encryption algorithm and an integrity protection algorithm. A control plane security algorithm and a user plane security algorithm may be the same or may be different. When the control plane security algorithm and the user plane security algorithm are different, the foregoing security algorithm is the user plane security algorithm. When different user plane security algorithms corresponding to different PDU session identifiers are different, the foregoing security algorithm is a user plane security algorithm corresponding to the PDU session identifier. The security algorithm herein is a security algorithm selected by the control plane CU based on a security capability of the control plane CU and UE security capability information. Alternatively, the user plane CU sends in advance a user plane security algorithm supported by the user plane CU to the control plane CU, and the control plane CU selects a proper security algorithm based on the user plane security algorithm supported by the user plane CU and a UE security algorithm capability.

In particular, the control plane CU may further send, to the user plane CU, an indication indicating whether user plane integrity protection at a DRB granularity or a QoS flow granularity is enabled. For example, the control plane CU sends a user plane integrity protection key of a PDU 1 to the user plane CU, and provides an indication indicating whether user plane integrity protection at a DRB granularity or a QoS flow granularity is enabled. The user plane decides, according to the indication, whether to perform integrity protection on user plane data corresponding to the DRB identifier or a QoS flow identifier. The indication may further be extended to an indication indicating whether control plane encryption, control plane integrity protection, user plane encryption, and user plane integrity protection are enabled.

In this embodiment, the control plane CU receives the user plane base key sent by the core network, and the control plane CU derives the user plane key based on the user plane base key, and sends the PDU session identifier and the user plane key corresponding to the PDU session identifier to the user plane CU. The user plane CU performs security processing on the user plane data in the PDU session by using the user plane key corresponding to the PDU session identifier and the security algorithm, thereby improving data transmission security in a CP-UP separation scenario.

Figure 15:
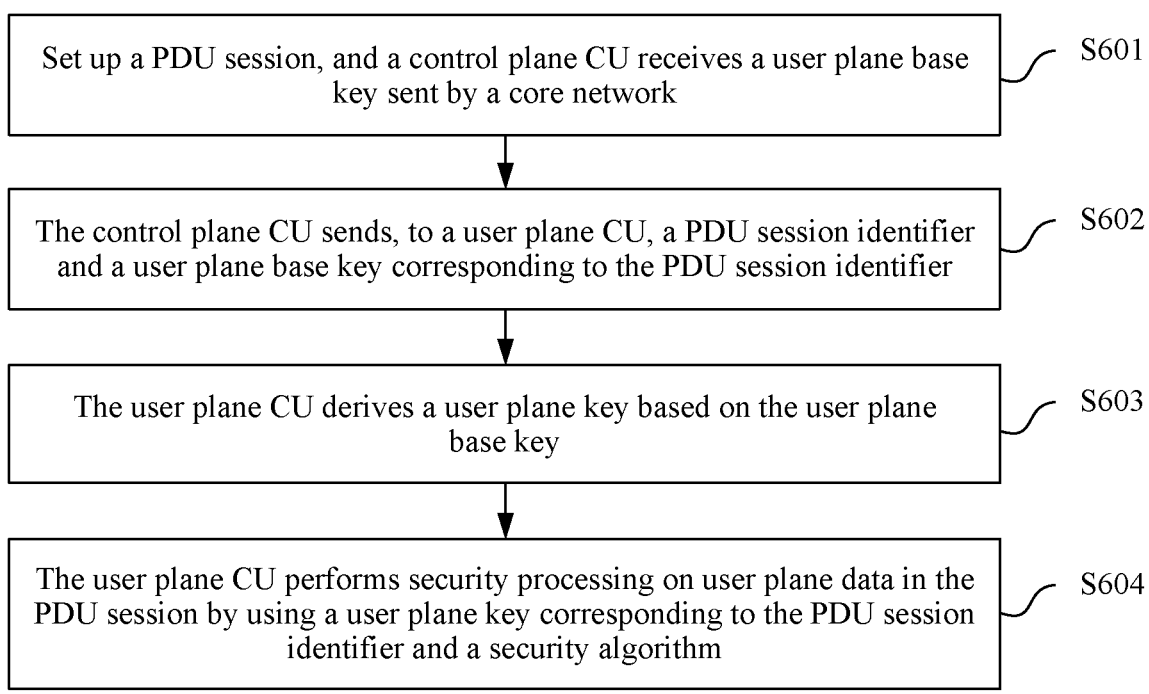
FIG. 15 is a flowchart of an embodiment of a data security processing method according to this application.

FIG. 15 is a flowchart of an embodiment of a data security processing method according to this application. As shown in FIG. 15, in this embodiment, a base station includes a CU and a DU, the CU includes a control plane CU and a user plane CU, and the control plane CU is connected to the user plane CU through a communications interface. In a CU-DU separation scenario, the method in this embodiment may include the following steps.

S601. Set up a PDU session, and the control plane CU receives a user plane base key sent by a core network.

S602. The control plane CU sends, to the user plane CU, a PDU session identifier and a user plane base key corresponding to the PDU session identifier.

S603. The user plane CU derives a user plane key based on the user plane base key, where the user plane key includes a user plane encryption key and/or a user plane integrity protection key.

S604. The user plane CU performs security processing on user plane data in the PDU session by using a user plane key corresponding to the PDU session identifier and a security algorithm. Obtaining of the security algorithm is the same as that in step S503.

Further, the method further includes the following:

The control plane CU sends, to the user plane CU, an indication indicating whether user plane integrity protection corresponding to the PDU session identifier is enabled. In particular, the control plane CU further sends an indication indicating whether user plane integrity protection at a DRB granularity or a QoS flow granularity is enabled. The indication may further be extended to an indication indicating whether control plane encryption, control plane integrity protection, user plane encryption, and user plane integrity protection are enabled.

The user plane CU determines, according to the indication, whether to derive a user plane integrity protection key corresponding to the PDU session identifier.

Optionally, the method further includes the following: The control plane CU sends a security algorithm selected based on UE security capability information to the user plane CU.

The security algorithm herein is a security algorithm selected by the control plane CU based on a security algorithm capability of the control plane CU and a UE security algorithm capability. Alternatively, the user plane CU sends in advance a user plane security algorithm supported by the user plane CU to the control plane CU, and the control plane CU selects a proper security algorithm based on the user plane security algorithm supported by the user plane CU and the UE security algorithm capability. The user plane CU performs security processing on the user plane data by using the user plane key and the security algorithm.

In this embodiment, the control plane CU receives the user plane base key sent by the core network, and the control plane CU sends the PDU session identifier and the user plane base key corresponding to the PDU session identifier to the user plane CU. The user plane CU derives the user plane key based on the user plane base key, and finally the user plane CU performs security processing on the user plane data in the PDU session by using the user plane key corresponding to the PDU session identifier and the security algorithm, thereby improving data transmission security in a CP-UP separation scenario.

Figure 16:
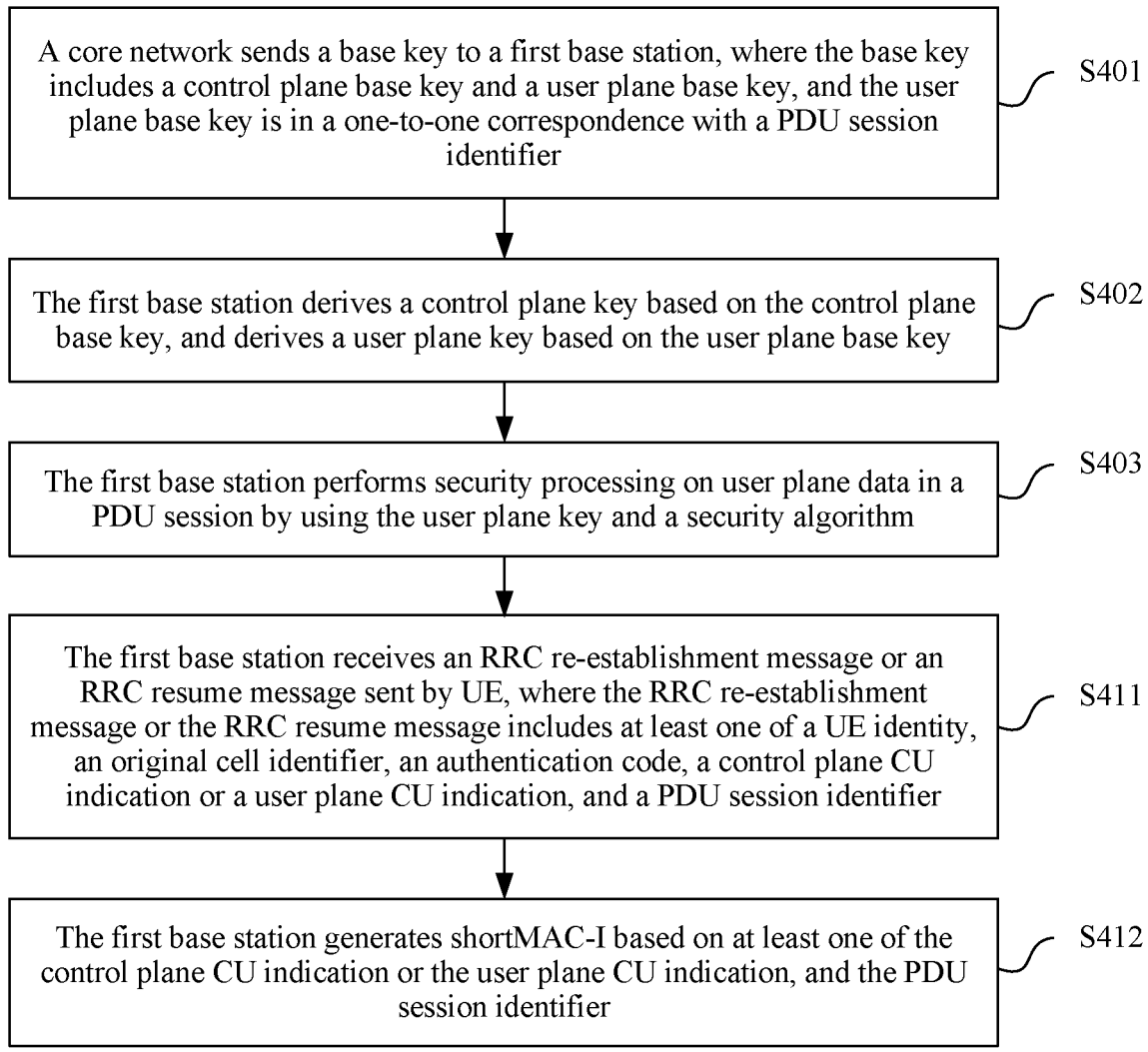
FIG. 16 is a flowchart of an embodiment of another data security processing method according to this application.

FIG. 16 is a flowchart of an embodiment of another data security processing method according to this application. As shown in FIG. 16, in this embodiment, on a basis of the method shown in FIG. 11, in an RRC reestablishment scenario, after a radio link failure occurs on UE, an RRC reestablishment procedure is initiated. The method in this embodiment may further include S411 and S412.

Specific execution processes of S411 and S412 are the same as those of S108 and S109 shown in FIG. 10, and technical effects thereof are also the same. Refer to specific descriptions of S108 and S109. Details are not described herein again.

Figure 17:
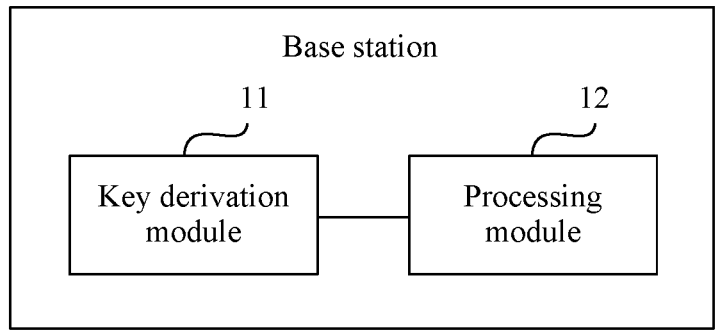
FIG. 17 is a schematic structural diagram of an embodiment of a base station according to this application.

FIG. 17 is a schematic structural diagram of an embodiment of a base station according to this application. As shown in FIG. 17, the base station in this embodiment may include a key derivation module 11 and a processing module 12. The key derivation module 11 is configured to derive a first user plane key based on a received base key when a first protocol data unit PDU session is set up, and the processing module 12 is configured to perform security processing on user plane data in the first PDU session by using the first user plane key and a security algorithm. The key derivation module 11 is further configured to: derive a second user plane key based on the base key when a second PDU session is set up, and the processing module 12 is further configured to perform security processing on user plane data in the second PDU session by using the second user plane key and the security algorithm, where the user plane key includes a user plane encryption key and/or a user plane integrity protection key.

Optionally, the key derivation module 11 is specifically configured to derive the first user plane key based on the base key and a first parameter, where the first parameter is a first PDU session identifier; and derive the second user plane key based on the base key and a second parameter, where the second parameter is a second PDU session identifier.

The apparatus in this embodiment may be configured to perform the technical solutions in the method embodiment shown in FIG. 6. An implementation principle and technical effects of the apparatus are similar to those of the method embodiment. Details are not described herein again.

Figure 18:
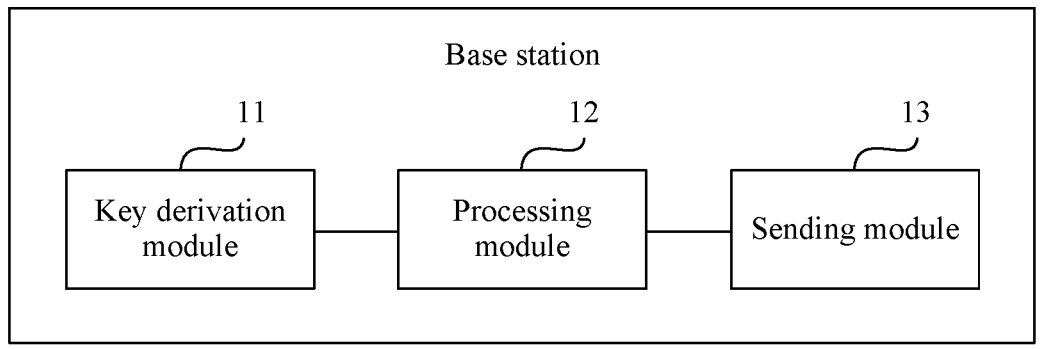
FIG. 18 is a schematic structural diagram of an embodiment of a base station according to this application.

FIG. 18 is a schematic structural diagram of an embodiment of a base station according to this application. As shown in FIG. 18, based on the structure of the base station shown in FIG. 17, further, the base station in this embodiment may further include a sending module 13. The sending module 13 is configured to send a target base key and at least one PDU session identifier to a second base station, so that the second base station derives, based on the target base key and the at least one PDU session identifier, a user plane key corresponding to the PDU session identifier, where the target base key is derived by the key derivation module based on the base key and a third parameter.

Optionally, the sending module 13 is further configured to: after sending the target base key and the at least one PDU session identifier to the second base station, send a target security algorithm to user equipment UE, where the target security algorithm is selected by the second base station for the UE based on UE security capability information sent by the base station, and sent by the second base station to the base station; and send the third parameter and the at least one PDU session identifier to the UE, so that the UE derives the target base key based on a base key of the UE and the third parameter, derives, based on the target base key and the at least one PDU session identifier, the user plane key corresponding to the PDU session identifier, and then performs security processing on user plane data in the PDU session by using the user plane key corresponding to the PDU session identifier and the target security algorithm.

Optionally, the base station in this embodiment is a source base station, the second base station is a target handover base station, and the third parameter includes at least one of a next-hop chain counter NCC, a target cell identifier, and frequency information.

Optionally, the base station in this embodiment is a master base station, the second base station is a secondary base station, and the third parameter includes a secondary cell group SCG counter.

Optionally, the sending module 13 is further configured to send, to the second base station, an indication indicating whether user plane integrity protection corresponding to the PDU session identifier is enabled, so that the second base station determines, according to the indication, whether to derive a user plane integrity protection key corresponding to the PDU session identifier.

Further, the base station includes a centralized unit CU and a distributed unit DU. The CU includes a control plane CU and a user plane CU. The control plane CU is connected to the user plane CU through a communications interface. The key derivation module 11 is specifically configured to: control the control plane CU to derive the first user plane key based on the base key and the first parameter, and send the first parameter and the first user plane key corresponding to the first parameter to the user plane CU.

The key derivation module 11 is specifically configured to: control the control plane CU to derive the second user plane key based on the base key and the second parameter, and send the second parameter and the second user plane key corresponding to the second parameter to the user plane CU.

Further, the base station includes a centralized unit CU and a distributed unit DU. The CU includes a control plane CU and a user plane CU. The control plane CU is connected to the user plane CU through a communications interface.

The key derivation module 11 is specifically configured to: control the control plane CU to send the base key and the first parameter to the user plane CU, so that the user plane CU derives the first user plane key based on the base key and the first parameter.

The key derivation module 11 is specifically configured to: control the control plane CU to send the base key and the second parameter to the user plane CU, so that the user plane CU derives the second user plane key based on the base key and the second parameter.

Optionally, the key derivation module 11 is further configured to: control the control plane CU to send, to the user plane CU, an indication indicating whether user plane integrity protection corresponding to the PDU session identifier is enabled; and control the user plane CU to determine, according to the indication, whether to derive a user plane integrity protection key corresponding to the PDU session identifier.

Optionally, the processing module 12 is configured to control the control plane CU to send the security algorithm to the user plane CU.

The processing module is configured to control the user plane CU to perform security processing on the user plane data in the first PDU session by using the first user plane key and the security algorithm.

The processing module 12 is configured to control the user plane CU to perform security processing on the user plane data in the second PDU session by using the second user plane key and the security algorithm.

The apparatus in this embodiment may be configured to perform the technical solutions of the method embodiment shown in any one of FIG. 7 to FIG. 9. An implementation principle and technical effects of the apparatus are similar to those of the method embodiment. Details are not described herein again.

Figure 19:
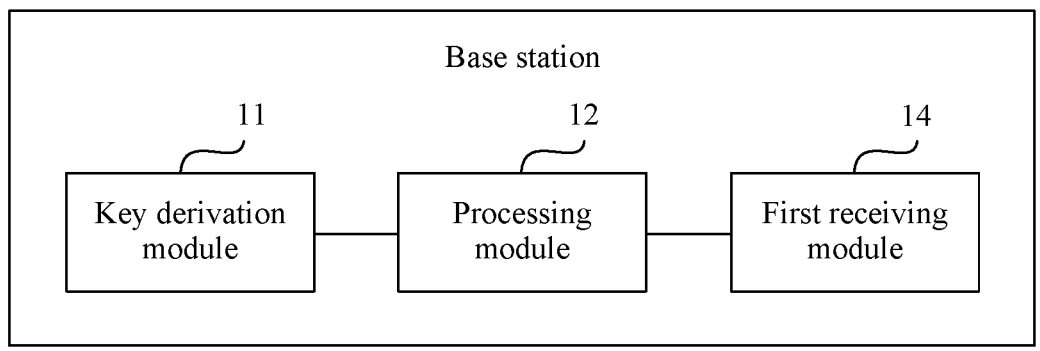
FIG. 19 is a schematic structural diagram of an embodiment of a base station according to this application.

FIG. 19 is a schematic structural diagram of an embodiment of a base station according to this application. As shown in FIG. 19, based on the structure of the base station shown in FIG. 17, further, the base station may further include a first receiving module 14. The first receiving module 14 is configured to receive a radio resource control RRC reestablishment message or an RRC resume message sent by the UE, where the RRC reestablishment message or the RRC resume message includes at least one of a UE identity, an original cell identifier, shortMAC-I, a control plane CU indication or a user plane CU indication, and a PDU session identifier. The processing module 12 is further configured to generate shortMAC-I based on at least one of the UE identity, the original cell identifier, the control plane CU indication or the user plane CU indication, and the PDU session identifier, and determine, by comparing the generated shortMAC-I with the shortMAC-I sent by the UE, whether authentication succeeds.

The apparatus in this embodiment may be configured to perform the technical solutions in the method embodiment shown in FIG. 10 or FIG. 16. An implementation principle and technical effects of the apparatus are similar to those of the method embodiment. Details are not described herein again.

Figure 20:
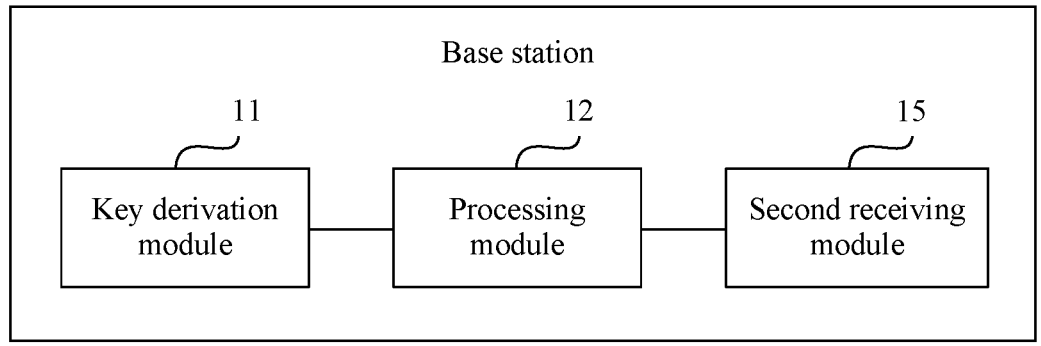
FIG. 20 is a schematic structural diagram of an embodiment of a base station according to this application.

FIG. 20 is a schematic structural diagram of an embodiment of a base station according to this application. As shown in FIG. 20, based on the structure of the base station shown in FIG. 17, further, the base station may further include a second receiving module 15. The second receiving module 15 is configured to receive a first PDU session identifier and an indication indicating whether user plane integrity protection corresponding to the first PDU session identifier is enabled, where the first PDU session identifier and the indication are sent by a core network. The processing module 12 is further configured to: determine, according to the indication, whether to derive a user plane integrity protection key corresponding to the first PDU session identifier. The second receiving module 15 is further configured to receive a second PDU session identifier and an indication indicating whether user plane integrity protection corresponding to the second PDU session identifier is enabled, where the second PDU session identifier and the indication are sent by the core network. The processing module 12 is further configured to determine, according to the indication, whether to derive a user plane integrity protection key corresponding to the second PDU session identifier.

Figure 21:
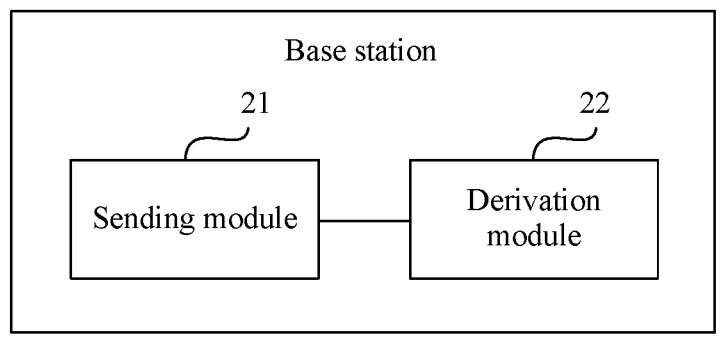
FIG. 21 is a schematic structural diagram of an embodiment of a base station according to this application.

FIG. 21 is a schematic structural diagram of an embodiment of a base station according to this application. As shown in FIG. 21, the base station in this embodiment may include a sending module 21 and a derivation module 22. The sending module 21 is configured to send, to a second base station, a target control plane base key, at least one PDU session identifier, and a target user plane base key respectively corresponding to the at least one PDU session identifier, so that the second base station derives a target control plane key based on the target control plane base key, and derives a target user plane key based on the target user plane base key, where the target control plane key includes a control plane encryption key and/or a control plane integrity protection key, and the target user plane key includes a user plane encryption key and/or a user plane integrity protection key. The derivation module 22 is configured to derive the target control plane base key based on a control plane base key and a first parameter, and derive the target user plane base key based on a user plane base key and a second parameter, where the second parameter is in a one-to-one correspondence with a PDU session identifier, the control plane base key is sent by a core network when a PDU session is set up for the first time, and the user plane base key is sent by the core network when a PDU session is set up.

Optionally, the sending module 21 is further configured to: after sending, to the second base station, the target control plane base key, the at least one PDU session identifier, and the target user plane base key respectively corresponding to the at least one PDU session identifier, send a target first security algorithm and a target second security algorithm to user equipment UE, where the target first security algorithm and the target second security algorithm are selected by the second base station for the UE based on UE security capability information sent by the base station, and sent by the second base station to the base station; and send the first parameter and the second parameter to the UE, so that the UE derives the target control plane base key based on a control plane base key of the UE and the first parameter, derives the target user plane base key based on a user plane base key of the UE and the second parameter, derives the target control plane key based on the target control plane base key, derives the target user plane key based on the target user plane base key, performs security processing on control plane data by using the target control plane key and the target first security algorithm, and performs security processing on user plane data in the PDU session by using the target user plane key and the target second security algorithm.

Optionally, the base station in this embodiment is a source base station, and the second base station is a target handover base station. The first parameter includes at least one of a next-hop chain counter NCC, a target cell identifier, and frequency information, and the second parameter includes at least one of an NCC, a target cell identifier, a PDU session identifier, and frequency information.

Optionally, the sending module 21 is further configured to send, to the second base station, an indication indicating whether user plane integrity protection corresponding to the PDU session identifier is enabled, so that the second base station determines, according to the indication, whether to derive a user plane integrity protection key corresponding to the PDU session identifier.

The apparatus in this embodiment may be configured to perform the technical solutions in the method embodiment shown in FIG. 12A and FIG. 12B. An implementation principle and technical effects of the apparatus are similar to those of the method embodiment. Details are not described herein again.

Figure 22:
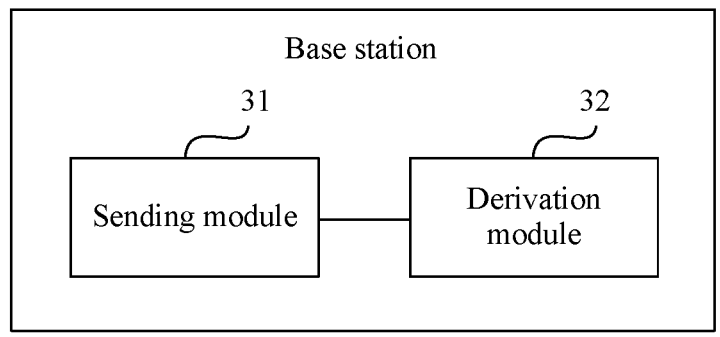
FIG. 22 is a schematic structural diagram of an embodiment of a base station according to this application.

FIG. 22 is a schematic structural diagram of an embodiment of a base station according to this application. As shown in FIG. 22, the base station in this embodiment may include a sending module 31 and a derivation module 32. The sending module 31 is configured to send, to a second base station, at least one PDU session identifier and a target user plane base key respectively corresponding to the at least one PDU session identifier, so that the second base station derives a target user plane key based on the target user plane base key, where the target user plane key includes a user plane encryption key and/or a user plane integrity protection key. The derivation module 32 is configured to derive the target user plane base key based on a user plane base key and a second parameter, where the second parameter is in a one-to-one correspondence with the PDU session identifier, and the user plane base key is sent by a core network when a PDU session is set up.

Optionally, the sending module 31 is further configured to: after sending, to the second base station, the at least one PDU session identifier and the target user plane base key respectively corresponding to the at least one PDU session identifier, send a target second security algorithm to user equipment UE, where the target second security algorithm is selected by the second base station for the UE based on UE security capability information sent by the base station, and sent by the second base station to the base station; and send the second parameter to the UE, so that the UE derives the target user plane base key based on a user plane base key of the UE and the second parameter, derives the target user plane key based on the target user plane base key, and performs security processing on user plane data corresponding to the PDU session identifier by using the target user plane key and the target second security algorithm.

Optionally, the sending module 31 is further configured to: when sending, to the second base station, the at least one PDU session identifier and the target user plane base key respectively corresponding to the at least one PDU session identifier, send a target control plane base key to the second base station, so that the second base station derives a target control plane key based on the target control plane base key, where the target control plane base key is derived by the base station based on a control plane base key and a first parameter.

Optionally, the sending module 31 is further configured to: after sending the target control plane base key to the second base station, send a target first security algorithm to the UE, where the target first security algorithm is selected by the second base station for the UE based on the UE security capability information sent by the base station, and sent by the second base station to the base station; and send the first parameter to the UE, so that the UE derives the target control plane base key based on a control plane base key of the UE and the first parameter, then derives the target control plane key based on the target control plane base key, and performs security processing on control plane data by using the target control plane key and the target first security algorithm.

The base station in this embodiment is a master base station, and the second base station is a secondary base station. The first parameter includes an SCG counter, and the second parameter includes an SCG counter and a PDU session identifier.

Optionally, the sending module 31 is further configured to send, to the second base station, an indication indicating whether user plane integrity protection corresponding to the PDU session identifier is enabled, so that the second base station determines, according to the indication, whether to derive a user plane integrity protection key corresponding to the PDU session identifier.

The apparatus in this embodiment may be configured to perform the technical solutions in the method embodiment shown in FIG. 13A and FIG. 13B. An implementation principle and technical effects of the apparatus are similar to those of the method embodiment. Details are not described herein again.

Figure 23:
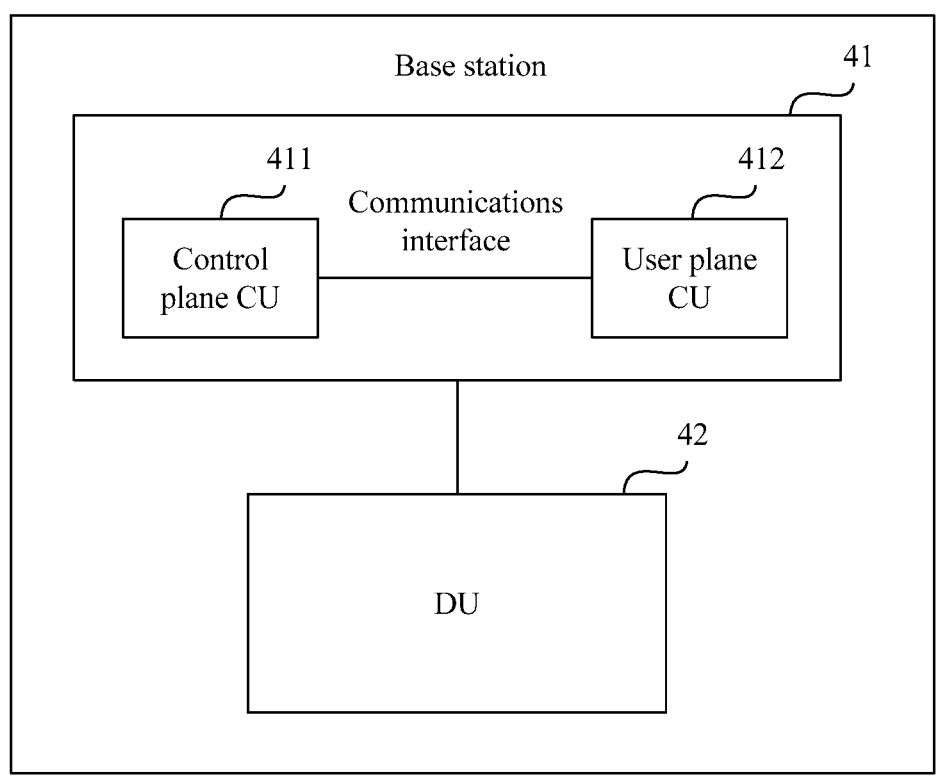
FIG. 23 is a schematic structural diagram of an embodiment of a base station according to this application.

FIG. 23 is a schematic structural diagram of an embodiment of a base station according to this application. As shown in FIG. 23, the base station in this embodiment includes a CU 41 and a DU 42. The CU includes a control plane CU 411 and a user plane CU 412. The control plane CU 411 is connected to the user plane CU 412 through a communications interface. The control plane CU 411 is configured to: when a PDU session is set up, receive a user plane base key sent by a core network; derive a user plane key based on the user plane base key; and send a PDU session identifier and a user plane key corresponding to the PDU session identifier to the user plane CU 412, where the user plane key includes a user plane encryption key and/or a user plane integrity protection key. The user plane CU 412 is configured to perform security processing on user plane data in the PDU session by using the user plane key corresponding to the PDU session identifier and a security algorithm.

The apparatus in this embodiment may be configured to perform the technical solutions in the method embodiment shown in FIG. 14. An implementation principle and technical effects of the apparatus are similar to those of the method embodiment. Details are not described herein again.

Figure 24:
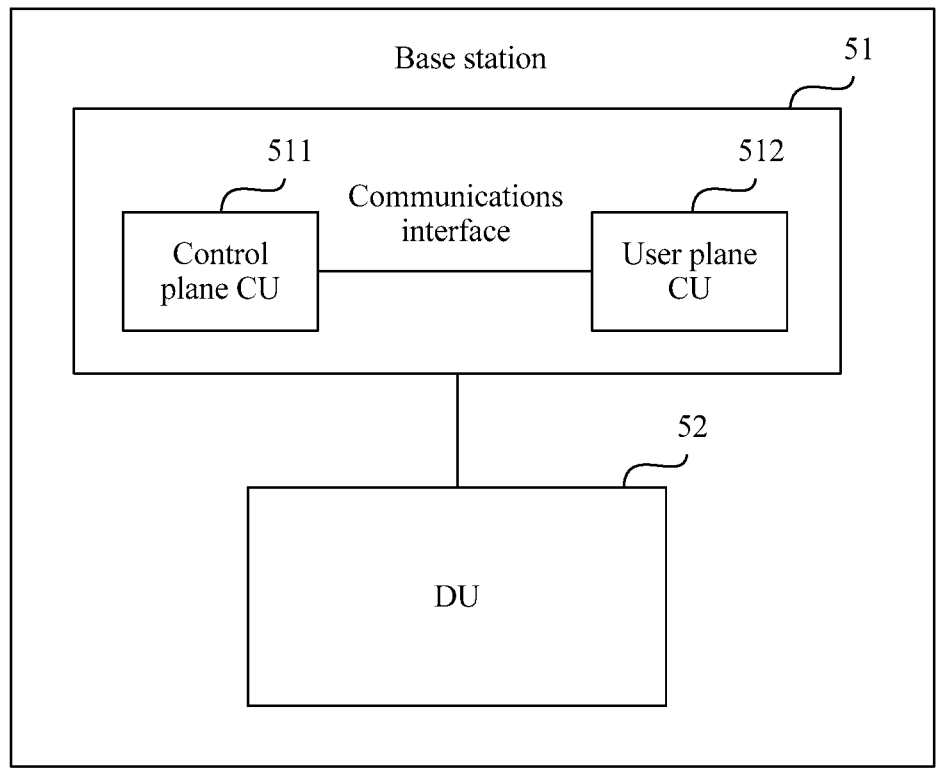
FIG. 24 is a schematic structural diagram of an embodiment of a base station according to this application.

FIG. 24 is a schematic structural diagram of an embodiment of a base station according to this application. As shown in FIG. 24, the base station in this embodiment includes a CU 51 and a DU 52. The CU includes a control plane CU 511 and a user plane CU 512. The control plane CU 511 is connected to the user plane CU 512 through a communications interface. The control plane CU 511 is configured to: when a PDU session is set up, receive a user plane base key sent by a core network; and send a PDU session identifier and a user plane base key corresponding to the PDU session identifier to the user plane CU 512.

The user plane CU 512 is configured to derive a user plane key based on the user plane base key, where the user plane key includes a user plane encryption key and/or a user plane integrity protection key; and perform security processing on user plane data in the PDU session by using a user plane key corresponding to the PDU session identifier and a security algorithm.

Optionally, the control plane CU 511 is further configured to send, to the user plane CU 512, an indication indicating whether user plane integrity protection corresponding to the PDU session identifier is enabled. The user plane CU 512 is further configured to determine, according to the indication, whether to derive a user plane integrity protection key corresponding to the PDU session identifier.

Optionally, the control plane CU 511 is further configured to send a security algorithm selected based on user equipment UE security capability information to the user plane CU 512.

The apparatus in this embodiment may be configured to perform the technical solutions in the method embodiment shown in FIG. 15. An implementation principle and technical effects of the apparatus are similar to those of the method embodiment. Details are not described herein again.

Figure 25:
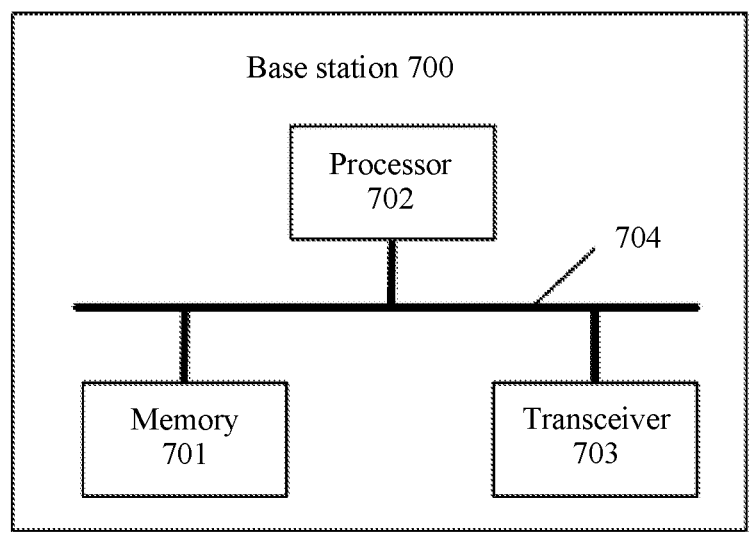
FIG. 25 is a schematic structural diagram of a base station according to this application.

FIG. 25 is a schematic structural diagram of a base station according to this application. The base station 700 includes a memory 701, a processor 702, and a transceiver 703. The memory 701, the processor 702, and the transceiver 703 communicate with each other by using a bus 704.

The transceiver 702 is used by the base station to perform data receiving/sending with the external. The memory 701 stores a program instruction. The processor invokes the program instruction stored in the memory, so as to perform an operation on a base station in the method in any one of the embodiments shown in FIG. 6 to FIG. 16. For details, refer to related descriptions in the foregoing method embodiments.

This application further provides a system chip, applied to a base station. The system chip includes an input/output interface, at least one processor, a memory, and a bus. The input/output interface, the at least one processor, and the memory communicate with each other by using the bus. The memory stores a program instruction, the input/output interface is used by the system chip to perform data receiving/sending with the external, and the at least one processor invokes the program instruction stored in the memory, to perform an operation on a base station in the method in any one of the embodiments shown in FIG. 6 to FIG. 16. For details, refer to related descriptions in the foregoing method embodiments.

This application further provides a program product, applied to a base station. The computer program product includes an instruction, and when the instruction is executed by a computing apparatus, an operation on a base station in the method in any one of the embodiments shown in FIG. 6 to FIG. 16 is performed.

This application further provides a readable storage medium, applied to a base station. The computer readable storage medium includes an instruction, and when the instruction is executed by a computing apparatus, an operation on a base station in the method in any one of the embodiments shown in FIG. 6 to FIG. 16 is performed.

A person of ordinary skill in the art may understand that some or all of the steps of the method embodiments may be implemented by a program instructing related hardware. The program may be stored in a computer-readable storage medium. When the program runs, the foregoing steps of the method embodiments are performed. The foregoing storage medium includes various media that can store program code, such as a ROM, a RAM, a magnetic disk, or an optical disc.

What is claimed is:

1. A data security processing method, the method comprising:
   setting up a first protocol data unit (PDU) session;
   deriving, by a first base station, a first user plane key based on a received base key;
   performing, by the first base station, security processing on user plane data in the first PDU session by using the first user plane key and a security algorithm;
   setting up a second PDU session;
   deriving, by the first base station, a second user plane key based on the base key; and
   performing, by the first base station, security processing on user plane data in the second PDU session by using the second user plane key and the security algorithm;
   sending, by the first base station, a target security algorithm, a third parameter, and at least one PDU session identifier to user equipment (UE), wherein the UE derives a target base key based on the base key and the third parameter, wherein the UE further derives, based on the target base key and the at least one PDU session identifier, a user plane key corresponding to the at least one PDU session identifier, and wherein the UE further performs security processing on user plane data in a PDU session corresponding to the at least one PDU session identifier by using the user plane key corresponding to the at least one PDU session identifier and the target security algorithm.

2. The method according to claim 1, wherein:
   the deriving, by a first base station, a first user plane key based on a received base key comprises:
      deriving, by the first base station, the first user plane key based on the base key and a first parameter, wherein the first parameter is a first PDU session identifier; and
   the deriving, by the first base station, a second user plane key based on the base key comprises:
      deriving, by the first base station, the second user plane key based on the base key and a second parameter, wherein the second parameter is a second PDU session identifier.

3. The method according to claim 2, further comprising:
   sending, by the first base station, the target base key and the at least one PDU session identifier to a second base station, wherein the second base station derives, based on the target base key and the at least one PDU session identifier, the user plane key corresponding to the at least one PDU session identifier, wherein the target base key is derived by the first base station based on the base key and a third parameter.

4. The method according to claim 3, wherein the target security algorithm is selected by the second base station for the UE based on UE security capability information sent by the first base station, and sent by the second base station to the first base station.

5. The method according to claim 4, further comprising:
   sending, by the first base station to the second base station, an indication indicating whether user plane integrity protection corresponding to the at least one PDU session identifier is enabled, wherein the second base station determines, according to the indication, whether to derive a user plane integrity protection key corresponding to the at least one PDU session identifier.

6. The method according to claim 3, wherein the first base station is a source base station, wherein the second base station is a target handover base station, and wherein the third parameter comprises at least one of a next-hop chain counter (NCC), a target cell identifier, or frequency information.

7. The method according to claim 3, wherein the first base station is a master base station, wherein the second base station is a secondary base station, and wherein the third parameter comprises a secondary cell group (SCG) counter.

8. The method according to claim 2, wherein the first base station comprises a centralized unit (CU) and a distributed unit (DU), wherein the CU comprises a control plane CU and a user plane CU, wherein the control plane CU is connected to the user plane CU through a communications interface, and wherein:

the deriving, by the first base station, the first user plane key based on the base key and a first parameter comprises:
deriving, by the control plane CU, the first user plane key based on the base key and the first parameter; and
sending the first parameter and the first user plane key corresponding to the first parameter to the user plane CU; and
the deriving, by the first base station, the second user plane key based on the base key and a second parameter comprises:
deriving, by the control plane CU, the second user plane key based on the base key and the second parameter; and
sending the second parameter and the second user plane key corresponding to the second parameter to the user plane CU.

9. The method according to claim 8, wherein the method further comprises:
sending, by the control plane CU, the security algorithm to the user plane CU;
wherein the performing, by the first base station, security processing on user plane data in the first PDU session by using the first user plane key and a security algorithm comprises:
performing, by the user plane CU, security processing on the user plane data in the first PDU session by using the first user plane key and the security algorithm; and
wherein the performing, by the first base station, security processing on user plane data in the second PDU session by using the second user plane key and the security algorithm comprises:
performing, by the user plane CU, security processing on the user plane data in the second PDU session by using the second user plane key and the security algorithm.

10. The method according to claim 2, wherein the first base station comprises a CU and a DU, wherein the CU comprises a control plane CU and a user plane CU, wherein the control plane CU is connected to the user plane CU through a communications interface, and wherein:

the deriving, by the first base station, the first user plane key based on the base key and a first parameter comprises:
sending, by the control plane CU, the base key and the first parameter to the user plane CU; and
deriving, by the user plane CU, the first user plane key based on the base key and the first parameter; and
the deriving, by the first base station, the second user plane key based on the base key and a second parameter comprises:
sending, by the control plane CU, the base key and the second parameter to the user plane CU; and
deriving, by the user plane CU, the second user plane key based on the base key and the second parameter.

11. The method according to claim 10, further comprising:
sending, by the control plane CU to the user plane CU, an indication indicating whether user plane integrity protection corresponding to a PDU session identifier is enabled; and
determining, by the user plane CU according to the indication, whether to derive a user plane integrity protection key corresponding to the PDU session identifier.

12. The method according to claim 2, further comprising:
receiving, by the first base station, the first PDU session identifier and an indication indicating whether user plane integrity protection corresponding to the first PDU session identifier is enabled, wherein the first PDU session identifier and the indication are sent by a core network;
determining, by the first base station according to the indication, whether to derive a user plane integrity protection key corresponding to the first PDU session identifier;
receiving, by the first base station, the second PDU session identifier and an indication indicating whether user plane integrity protection corresponding to the second PDU session identifier is enabled, wherein the second PDU session identifier and the indication are sent by the core network; and
determining, by the first base station according to the indication, whether to derive a user plane integrity protection key corresponding to the second PDU session identifier.

13. The method according to claim 1, further comprising:
receiving, by the first base station, a radio resource control (RRC) reestablishment message or an RRC resume message sent by UE, wherein the RRC reestablishment message or the RRC resume message comprises at least one of a UE identity, an original cell identifier, an authentication code shortMAC-I (shortMAC-I), a control plane CU indication or a user plane CU indication, or a PDU session identifier;
generating, by the first base station, shortMAC-I based on at least one of the UE identity, the original cell identifier, the control plane CU indication or the user plane CU indication, and the PDU session identifier; and
determining, by comparing the generated shortMAC-I with the shortMAC-I sent by the UE, whether authentication succeeds.

* * * * *